United States Patent
Kawashima et al.

(10) Patent No.: US 6,480,345 B2
(45) Date of Patent: Nov. 12, 2002

(54) IMAGE MAGNIFYING/REDUCING OPTICAL DEVICE AND MANUFACTURING METHOD THEREOF

(75) Inventors: Ikue Kawashima, Kanagawa; Shigeaki Nimura, Chiba, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/894,531

(22) Filed: Jun. 29, 2001

(65) Prior Publication Data

US 2002/0021501 A1 Feb. 21, 2002

(30) Foreign Application Priority Data

Jun. 30, 2000 (JP) ......................... 2000-198027
Jun. 30, 2000 (JP) ......................... 2000-198028
Aug. 2, 2000 (JP) ......................... 2000-233986
Nov. 22, 2000 (JP) ......................... 2000-355299

(51) Int. Cl.$^7$ ............................................. G02B 27/02
(52) U.S. Cl. .......................................... 359/802
(58) Field of Search ..................... 359/619, 742, 359/802, 620; 385/119; 358/451; 264/1.1

(56) References Cited

U.S. PATENT DOCUMENTS 6,219,119 B1 * 4/2001 Nakai ......................... 349/113

FOREIGN PATENT DOCUMENTS

| JP | 4-119322 | 4/1992 |
| JP | 5-80319 | 4/1993 |
| JP | 5-88617 | 4/1993 |
| JP | 5-157923 | 6/1993 |
| JP | 6-51142 | 2/1994 |
| JP | 7-43702 | 2/1995 |
| JP | 7-230018 | 8/1995 |
| JP | 7-294757 | 11/1995 |
| JP | 9-37038 | 2/1997 |
| JP | 9-252444 | 9/1997 |
| JP | 11-326660 | 11/1999 |

* cited by examiner

Primary Examiner—Ricky Mack
(74) Attorney, Agent, or Firm—Oblon, Spivak, McClelland, Maier & Neustadt, P.C.

(57) ABSTRACT

An image magnifying/reducing optical device includes a base member having first and second surfaces which are approximately parallel to one another; and a plurality of high-refractive-index regions formed in the base member. The plurality of high-refractive-index regions continuously extending from the first surface to the second surface of the base member; and a sectional area of each of said plurality of high-refractive-index regions around the second surface being larger than that around the first surface.

46 Claims, 31 Drawing Sheets

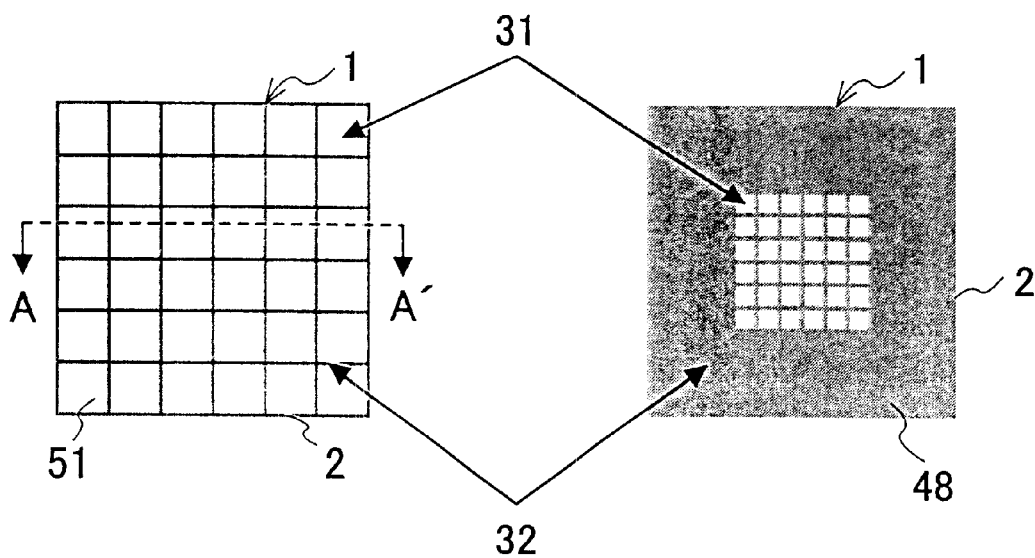
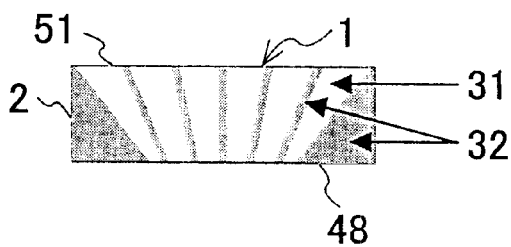

IMAGE MAGNIFYING/REDUCING OPTICAL DEVICE AND MANUFACTURING METHOD THEREOF

BACKGROUND OF THE INVENTION

1. Field of the Invention

The present invention generally relates to an image magnifying/reducing optical device used in an apparatus for displaying an image or taking an image, and a manufacturing method thereof, and, in particular, a two-dimensional magnifying/reducing optical device having advantages in that a light quantity is uniform throughout the device, and the device can be rendered thinner and light-weighted, and, other extremely remarkable advantages, and a manufacturing method thereof.

2. Description of the Related Art

Display apparatuses for displaying information include two types of ones, i.e., equal-size display apparatuses such as liquid-crystal monitors for personal computers called flat-panel display devices and magnifying projection display apparatuses such as rear-surface projection liquid-crystal televisions and so forth. In the equal-size display apparatus, it is possible to reduce the thickness of a display device, and, thereby, this requires a reduced space for setting it. However, when a large-sized screen is required, such as 30 inches or more, for example, a considerably high cost is needed due to complicateness of manufacturing process, a low production yield, and so forth. On the other hand, with regard to the magnifying projection display apparatus, it is possible to provide a large-sized display screen such as 50 inches or more while requiring a cost lower than that for the equal-size display apparatus. However, it is difficult to reduce the thickness of the display device in the magnifying projection display apparatus to that of the equal-size display apparatus, due to a reason for the principle thereof. Accordingly, a larger space is needed for setting the magnifying projection display apparatus.

In a conventional magnifying projection display apparatus such as a liquid-crystal television, a method of magnification by using a lens or a mirror is employed. Other than this, as shown in FIG. 1, optical fibers 11 are arranged for a small image, and, as a result of the optical fibers 11 being disposed discretely, the image is magnified (see Japanese Laid-Open Patent Application No. 05-88617, referred to as a method A). Further, as shown in FIG. 2, an image is magnified by using a plurality of blocks 1a, 1b each being obtained from cutting a set of optical fibers, obliquely (see Japanese Laid-Open Patent Application No. 06-51142, referred to as a method B). Furthermore, as shown in FIG. 3, in order to magnify displayed images of a plurality of liquid-crystal display panels 2a, 2b, ..., 2n, these displayed images are transmitted to a display panel 4 by using optical fibers 3 (see Japanese Laid-Open Patent Application No. 09-252444, referred to as a method C). As shown in FIG. 4, a displayed size of each pixel is magnified by using tapered optical waveguides 3 (see Japanese Laid-Open Patent Application No. 07-43702, referred to as a method D).

In the above-mentioned method A shown in FIG. 1, although the area of the displayed image is magnified, the pixels are disposed discretely, while each pixel itself is not magnified.

In the above-mentioned method B shown in FIG. 2, it is difficult that light is coupled from the block 1a to the block 1b at high efficiency. Furthermore, it is very difficult to align the block 1a with the block 1b at high accuracy when the blocks 1a and 1b are bonded together in a manufacturing process, in a case where the diameter of each optical fiber is very small.

In the above-mentioned method C shown in FIG. 3, it is possible to render a thin, seamless wide screen display apparatus by combining display apparatuses 2a through 2n having small screens. However, same as in the above-mentioned method A, each pixel itself is not magnified.

In the above-mentioned method D shown in FIG. 4, although each pixel itself is magnified, the pitch between the pixels is not magnified. Accordingly, the entire image is not magnified.

Other than them, in one method, an image is magnified by using a through hole of a metal (see Japanese Laid-Open Patent Application No. 5-80319). In another method, an image is magnified by using a reflection metal plate (see Japanese Laid-Open Patent Application No. 7-294757). However, when optical transmission by using a metal reflection plate is employed, differently from optical transmission methods employing optical fibers or optical waveguides, loss of light through reflection is large, and, as a result, it is not suitable for a practical use.

Further, as a demand for apparatuses for reading images such as a facsimile machine, an image scanner, a digital copier, and so forth, it is desired to miniaturize an image sensor which converts image information into an electric signal, and development of a miniaturized image reducing device is desired. For example, as a method of transmitting a one-dimensional image read from a wide original into a small one dimensional CCD, a method has been proposed in that tapered optical waveguides are arranged on the original surface, and reduced areas of the optical waveguides are used for coupling to the CCD (see Japanese Laid-Open Patent Application No. 09-37038). This method is advantageous when it is used for magnifying/reducing one-dimensional image. However, this method is not used for magnifying/reducing a two-dimensional image.

Further, a product for magnifying/reducing an image by not using a lens has been on sale as a name of "TaperMag" from Taper Vision Co. Ltd. of United States. In this device, many optical fibers are bundled up at high density, and are molten so as to be tapered. However, in this configuration, as glass fibers are bundled and worked, it is difficult to provide a large-scaled display area more than 100 mm square. Further, it is difficult to increase the tapering angle by the reason for a working process. In fact, when a display screen on the order of 30 inches is to be provided, it is not possible to reduce the thickens of the device less than 30 cm.

Further, although various manufacturing methods have been proposed for optical waveguides, they include methods for manufacturing a single fiber or a one-dimensional fiber array, but do not include a method for manufacturing a two-dimensional array which has a three-dimensional complicated shape- For example, Japanese Laid-Open Patent Application No. 11-326660 discloses a method of forming an opitcal waveguide along an optical axis by causing a specific light to be incident on photo-curing resin. However, this method merely produces a single optical waveguide, but does not produce a two-dimensional optical device made of a plurality of fiber arrays. Further, according to Japanese Laid-Open Patent Application No. 5-157923, ions are provided into glass by electric field, and thereby, three-dimensional optical waveguide is produced. However, this method is not practical for producing a complicated structure which is desired for the present invention.

Further, Japanese Laid-Open Patent Application No. 07-230018 discloses a method of producing a tapered optical waveguide at an extending end of an optical fiber. In this method, an optical fiber is immersed into photo-reacting substance, and ultraviolet light is applied into the optical fiber. However, in this method, the fiber used is a quartz single-mode optical fiber. Also, this publication discloses neither specific ultraviolet light source nor specific ultraviolet-curing material.

SUMMARY OF THE INVENTION

An object of the present invention is to solve the above-mentioned problems, and thus, to provide a thin two-dimensional image magnifying/reducing optical device by which the entire image and also each pixel size can be magnified/reduced without employing a conventional projection system, and a manufacturing method therefor.

An image magnifying/reducing optical device according to the present invention comprises:

a base member having first and second surface which are approximately parallel to one another; and a plurality of high-refractive-index regions formed in said base member, the plurality of high-refractive-index regions continuously extending from the first surface to the second surface of the base member; and a sectional area of each of the plurality of high-refractive-index regions around the second surface being larger than that around the first surface.

In this configuration, light incident on the high-refractive-index region and reflected by the interface with a low-refractive-index region is transmitted by the high-refractive-index region, from the first surface to the second surface. As the cross-sectional area of the high-refractive-index region is different between the first and second surfaces of the device, an image input to one surface is magnified/reduced through the device, and is output from the other surface. Thus, magnifying display of an image/reduction reading of an image can be rendered by the device.

Further, in this configuration, it is possible to yield a light-weighted device in comparison to an inorganic glass.

Further, when light is transmitted through each high-refractive-index region, the light is not mixed with light transmitted through another high-refractive-index region. Thereby each pixel can be positively enlarged.

Each of the plurality of high-refractive-index regions may extend approximately perpendicular to at least one of the first surface in the vicinity thereof and the second surface in the vicinity thereof.

Thereby, it is possible to achieve uniform light quantity throughout the device with a thin configuration of the device, and to easily produce the device.

A diameter of each of the plurality of high-refractive-index regions may be approximately fixed in a position in which a center-axis line thereof is inclined from a normal of the second surface by not less than 45°.

Thereby, it is possible to yield a thin device and to produce the device easily.

A cross-sectional area of each high-refractive-index region may be increased gradually in the vicinity of the second surface, and has a tapered shape.

Thereby, the shape of each fiber (high-refractive-index region) can be simplified, and a thin device can be yielded.

A cross-sectional area of each high-refractive-index region may be increased after being decreased from that on the first surface.

Thereby, it is possible to yield a further thinner device.

A micro lens may be disposed for one of the first and second surfaces, the one of the first and second surfaces being a surface on which light is incident for changing a size of an image.

Thereby, it is possible to reduce loss of light input to each fiber (high-refractive-index region).

One of a light absorbing layer and a metal film may be provided on a side surface of each high-refractive-index region.

Thereby, it is possible to avoid stray light between adjacent fibers (high-refractive-index regions).

Each high-refractive-index region may have one of a convex surface and a concave surface on at least one end surface thereof.

Thereby, it is possible to improve efficiency of taking light into each high-refractive-index region, and, also, to enlarge the angle of visibility of an image output from the device.

At least a part of each high-refractive-index region may be joined by a mesh-like high-polymer member having a shrinkable property in at least a part thereof.

Thereby, it is possible to automatically bundle the fibers (high-refractive-index regions) without disarrangement of the fibers.

At least a part of each high-refractive-index region may be joined by a member which can enter a gel-like state in at least at a part thereof.

Thereby, it is possible to automatically bundle the fibers (high-refractive-index regions) without disarrangement of the fibers. Also, it is not necessary to apply a force for expanding the member.

A relative relationship between the plurality of high-refractive-index regions on the first surface may be also maintained on the second surface.

Thereby, an image input to the device is maintained through the device without distortion.

A ratio of a cross-sectional area of each high-refractive-index region on the first surface to a cross-sectional area thereof on the second surface may be approximately uniform throughout the plurality of high-refractive-index region.

Thereby, an input image can be magnified without distortion.

The plurality of high-refractive-index regions may comprise at least a part at which a center-axis direction of the high-refractive-index region is inclined from a normal of the base member by not less than 45°.

Thereby, it is possible to effectively reduce the thickness of the device.

An angle between light transmitted by the high-refractive-index region when it is incident on the first surface and a normal of the base member is not more than 30° in the vicinity of the first surface.

Thereby, it is possible to improve the coupling effect of the incident light, and, as a result, to render the transmission efficiency of an image uniform throughout the device.

An angle between light transmitted by the high-refractive-index region when it exists from the second surface and a normal of the base member may be not more than 30° in the vicinity of the second surface.

Thereby, it is possible to reduce the view angle dependency for each pixel.

A cross-sectional shape of each high-refractive-index region may be approximately squire on the second surface.

Thereby, in comparison to circular cross section, it is possible to increase an area through which an image is transmitted in the device.

A cross-sectional shape of each high-refractive-index region may be approximately hexagon on the second surface.

Thereby, in comparison to circular cross section, it is possible to increase an area through which an image is transmitted in the device. Also, in comparison to a square cross section, a curved shape can be smoothly displayed.

The plurality of high-refractive-index regions may comprise high-polymer fibers.

Thereby, it is possible to yield a thin, inexpensive, light-weighted image magnifying/reducing optical device.

The high-polymer fiber at any position has a length lx satisfying the following formula (1):

$$t(n+1)\left(\sqrt{\frac{\sum_{a=1}^{N} Sa}{\sum_{a=1}^{N} sa}} - 1\right) + l_{min} \geq lx \geq \frac{l_{min}}{\sin\theta} \quad (1)$$

where:

N denotes the total number of the fibers;

a denotes the number of each fiber;

Sa denotes the area of the end surface of the fiber a on the second surface;

sa denotes the area of the end surface of the fiber a on the first surface;

$l_{min}$ denotes the length of the shortest fiber;

t denotes the averaged fiber interval on the first surface;

n denotes the number of fibers present between the relevant fiber and the shortest fiber; and θ denotes an angle of the straight line passing through the position of the relevant fiber on the first surface and the position of the same fiber on the second surface with respect to the first surface.

Thereby, the surface of the device can be rendered smooth, and the thickness of the device can be effectively reduced. Also, brightness uniformity throughout the device can be achieved.

The refractive index n1 of the plurality of high-refractive-index regions and the refractive index n2 of a low-refractive-index region surrounding the high-refractive-index regions may satisfy the following formula:

$$n1^2 - n2^2 \geq 0.07$$

Thereby, it is possible to improve the efficiency in taking light into and transmission thereof through the high-refractive-index regions, and thus, to increase brightness in the transmitted image The refractive indexes n1 and n2 may satisfy the following formula:

$$n1^2 - n2^2 \geq 0.25$$

Thereby, the performance can be further improved.

A cross-sectional area of the high-refractive-index region may be smaller than those on the first and second surfaces at least a part thereof.

Thereby, it is possible to effectively reduce the thickness of the device. Further, even if a member for bundling the fibers remains between the fibers, the fibers can be arraigned closely at both ends thereof.

Each high-refractive-index region may have an extending-end expanding-tapered shape such as to increasing a cross-sectional area gradually in at least one of the proximity of the first surface and the proximity of the second surface.

Thereby, it is possible to effectively reduce the thickness of the device.

The following formula (4) may be satisfied:

$$b < 252/(1-X) \quad (4)$$

where:

b ($\mu m^2$) denotes a cross-sectional area of at least a part of the high-refractive-index region other than both end parts thereof; and X denotes a value obtained from dividing a cross-sectional area of the high-refractive-index region on the first surface by that on the second surface, where X<1.

Thereby, in a case where an image having more than ten million pixels is taken in or output with 200 dpi, for example, it is possible to provide the device having the thickness of not more than 4 cm.

An image magnifying display device according to the present invention comprises:

the above-mentioned image magnifying/reducing optical device according to the present invention; and a display unit disposed so as to face the first surface of the image magnifying/reducing optical device.

Thereby, without using a conventional projection-type device, it is possible to render magnification of image itself and pixel size through a thin configuration.

An image reducing reading device according to the present invention comprises:

the image magnifying/reducing optical device according to the present invention; and a two-dimensional solid image pickup device disposed so as to face the first surface of the image magnifying/reducing optical device.

Thereby, it is possible to render reduction of image itself and pixel size through a thin configuration.

A method of manufacturing the above-mentioned optical device, comprises the step of a) making the high-polymer fibers from photo-curing resin.

The method may further comprise the steps of:

b) forming the high-polymer fibers by applying high-directivity light to the photo-curing resin; and c) bundling the thus-formed fibers so as to yield the plurality of high-refractive-index regions.

Thereby, it is easy to produce the optical device.

The method may further comprise the steps of:

d) disposing one end of a bundle of the fibers in a close collected state;

e) disposing the other end of the bundle of the fibers in a spaced state;

f) immersing the other end of the bundle fibers into photo-curing resin mixed solution; and g) applying light into the one end of the bundle of fibers so as to form tapered parts extending from the other end of bundle of fibers.

Thereby, the tapered parts can be produced automatically.

The method may further comprise the steps of:

d) disposing a substrate having one of a convex shape and a concave shape for each fiber of the bundle of fibers; and e) applying light toward the substrate in the photo-curing resin so as to form one of a concave shape and a convex shape on an end surface of each fiber of the bundle of fibers.

Thereby, the concave/convex end surface of each fiber can be automatically formed.

The method may further comprise the steps of:
b) providing one of a light absorbing layer and metal film on a side surface of each high-polymer fiber.

Thereby, it is possible to yield the optical device in which stray light can be avoided.

In the step d), light may be applied to the photo-curing resin mixed solution via a shrinkable mesh-like high-polymer member so as to form the fibers; and then, the mesh-like high-polymer member may be caused to shrink so that the intervals of the fibers are shortened without disarrangement of the fibers, and, thus, the fibers are joined closely together.

Thereby, the fibers can be easily bundled without disarrangement of the fibers, automatically.

Further, the shrinkable mesh-like member may be enter a high-polymer gel state.

Thereby, no force is needed for changing the intervals of the fibers.

A method of manufacturing the above-mentioned image magnifying/reducing optical device, according to the present invention, comprises the steps of:
a) producing a plurality of thin plates each having a plurality of high-refractive-index regions; and
b) coupling the plurality of thin plates together.

The thin plates may be made of material which has a refractive index changed as a result of ultraviolet ray being applied thereto.

Thereby, it is easy to produce the pattern of the high-refractive-index regions by using a photo mask in application of ultraviolet ray. Accordingly, it is possible to yield the optical device according to the present invention by mass-production basis with low costs.

In each thin plate, the plurality of high-refractive-index regions may have a refractive index higher than that of a surrounding region, and have a two-dimensional pattern in which the plurality of high-refractive-index regions are apart from each other;

the plurality of thin plates are different in an area of each high-refractive-index region in many steps; and in the step b), the plurality of thin plates are laminated together in the order of the area of high-refractive-index region, and in such a manner that the corresponding high-refractive-index regions are continuous through the plurality of thin plates.

Thereby, it is possible to produce the optical device according to the present invention by mass-production basis.

A method of manufacturing the above-mentioned image magnifying/reducing optical device, according to the present invention, comprises the steps of a) bundling a plurality of high-refractive-index fibers for the plurality of high-refractive-index regions, by using a mesh structure having variable intervals of elements thereof.

Thereby, it is possible to easily bundle the fibers with predetermined intervals.

A conic guiding member may be used for inserting each fiber of the plurality of high-refractive-index fibers into the mesh structure.

Thereby, it is not necessary to have a high positional accuracy in inserting the high-refractive-index fiber into the mesh structure.

The method may further comprise the step of coating adhesive on the fibers.

Thereby, the fibers can easily slide on each other, and, as a result, the bundling work can be performed easily. Also, fixing of the bundled fibers together can be easily performed.

At least a part of the fibers may be made of photo-curing resin.

Thereby, it is easy to produce the concave/convex end surface of the fiber according to the present invention.

A method of manufacturing the above-mentioned image magnifying/reducing optical device, according to the present invention, comprises the steps of:
a) bundling a plurality of high-refractive-index fibers for the plurality of high-refractive-index regions, so as to form a bundle of fibers; and
b) applying light into photo-curing resin mixed solution through the plurality of high-refractive-index fibers so as to form expanding tapered parts extending from one end of the bundle of fibers.

Thereby, the tapered parts can be produced easily and automatically.

The method may further comprise the steps of:
c) applying light into photo-curing resin mixed solution through the plurality of high-refractive-index fibers, after the step b), so as to form expanding tapered parts extending from the other end of the bundle of fibers.

Thereby, the tapered parts can be produced at both ends of the fibers easily and automatically. Accordingly, the above-mentioned shape of fiber according to the present invention in that the intermediate part is thinner than the end parts can be yielded.

The method may further comprise the steps of:
c) disposing a substrate having one of a convex shape and a concave shape for each fiber of the bundle of fibers; and
d) applying light toward the substrate in the photo-curing resin so as to form one of a concave shape and a convex shape on an end surface of each fiber of the bundle of fibers.

Thereby, the concave/convex end surface of the fiber can be easily and automatically produced.

The method may further comprise the steps of:
d) disposing a substrate having one of a convex shape and a concave shape for each fiber of the bundle of fibers; and
e) applying light toward the substrate in the photo-curing resin so as to form one of a concave shape and a convex shape on an end surface of each fiber of the bundle of fibers.

Thereby, the concave/convex end surface of the fiber can be easily and automatically produced.

The method may further comprise the steps of:
c) providing one of a light absorbing layer and metal film on a side surface of each high-polymer fiber.

The method may further comprise the steps of:
d) providing one of a light absorbing layer and metal film on a side surface of each high-polymer fiber.

Thereby, stray light between the fibers can be avoided.

Other objects and further features of the present invention will become more apparent from the following detailed description when read in conjunction with the accompanying drawings.

BRIEF DESCRIPTION OF THE DRAWINGS

FIGS. 5A, 5B and 5C illustrate a basic configuration of the present invention (FIG. 5A shows a plan view, FIG. 5B shows a bottom view and FIG. 5C shows a side-elevational sectional view);

DETAILED DESCRIPTION OF THE PREFERRED EMBODIMENTS

Figure 1:
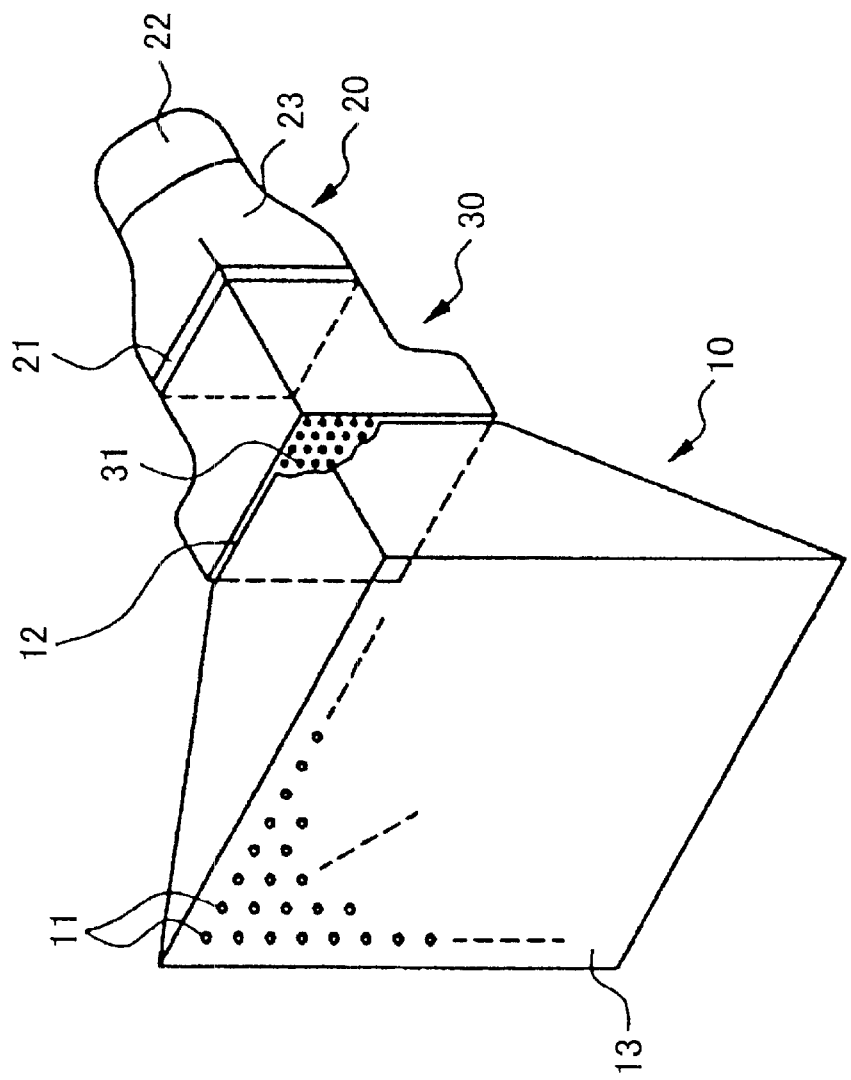
FIGS. 1, 2, 3 and 4 illustrate the prior arts.
Figure 2:
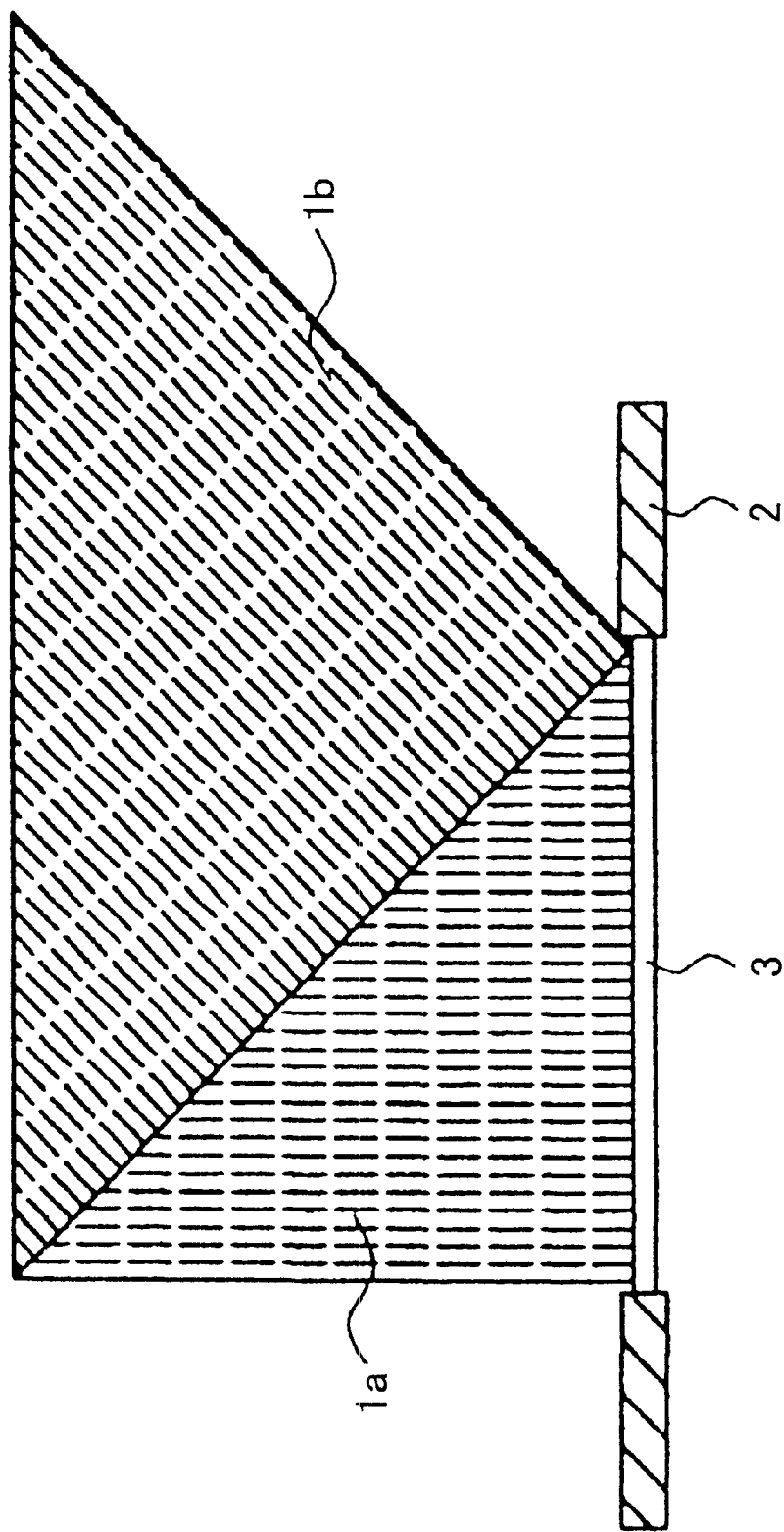
Figure 3:
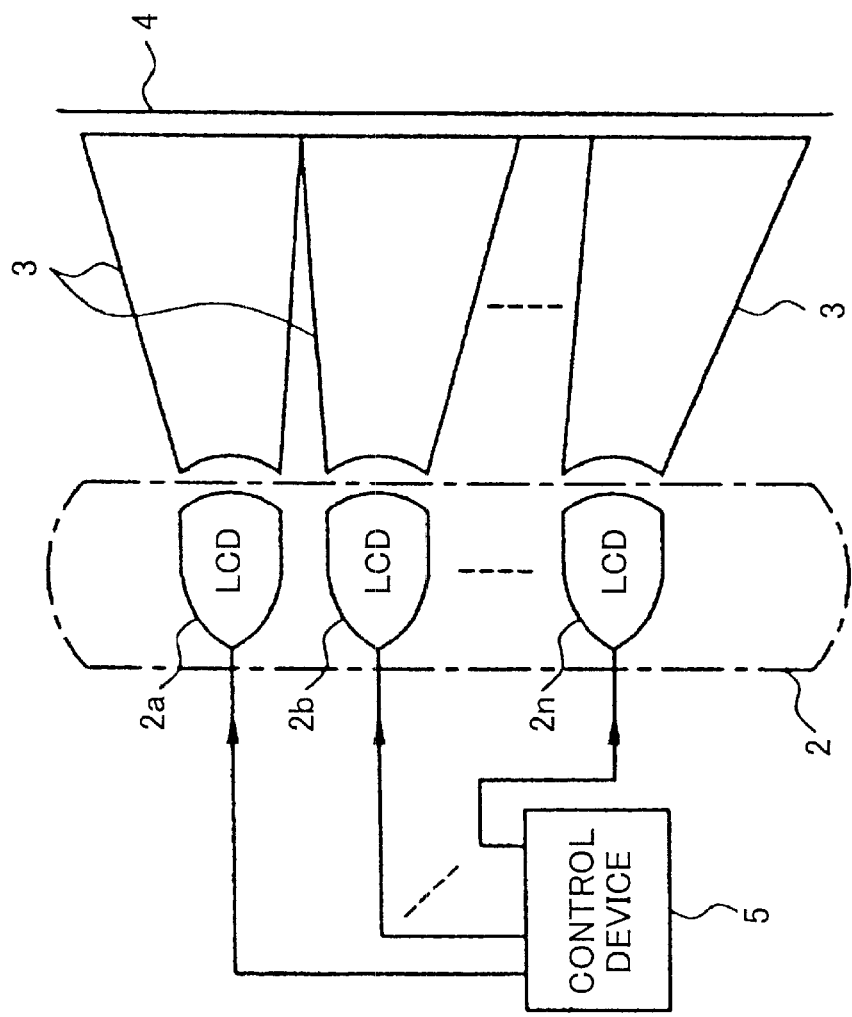
Figure 4:
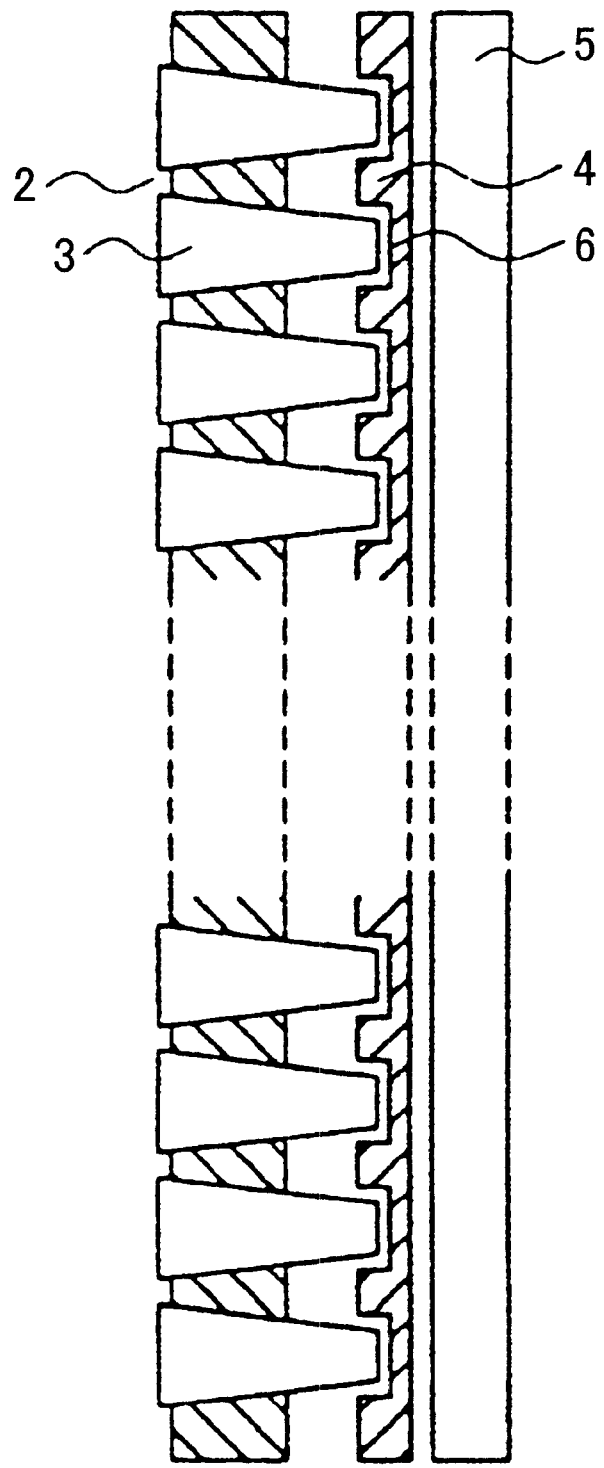

FIGS. 5A, 5B and 5C show a basic configuration of a plate-shaped two-dimensional image magnifying/reducing optical device 1 in a first embodiment of the present invention, FIG. 5A shows a plan view of the device 1, FIG. 5B shows a bottom view of the device and FIG. 5C shows a side-elevational sectional view of the device 1 taken along a line A-A' of FIG. 5A.

This optical device 1 includes a plurality of high-refractive-index regions 31 having a high refractive index in an organic material. As shown in FIG. 5C, each high-refractive-index region 31 extends from the bottom surface (reduction surface) 48 of the device 1 to the top surface (magnification surface) 51 thereof continuously, and, the cross-sectional area thereof is larger in a section perpendicular to the thickness direction nearer to the top surface 51. For example, as shown in FIG. 5A, each high-refractive-index region 31 has a square shape on the top surface of the optical device 1 while the high-refractive-index region 31 has a square shape on the bottom surface of the optical device 1 having a smaller area. The space between the high-refractive-index regions 31 is filled with a low-refractive-index region 32 (having a refractive index lower than that of the high-refractive-index regions 31) as shown in the figures.

Further, in order to provide a performance of magnifying transmission or reducing transmitting of an input/incident image, a relative positional relationship between the high-refractive-index regions 31 on the bottom surface of the optical device 1 is maintained also on the top surface of the optical device 1, as shown in FIG. 5C.

Further, in order to provide the performance of magnifying transmission or reducing transmitting of an image without distortion, the ratio of the area of the high-refractive-index region 31 on the bottom surface of the optical device 1 to the area of the same high-refractive-index region 31 on the top surface of the optical device 1 is approximately fixed throughout all the high-refractive-index regions 31.

This optical device 1 is basically formed by using a plate-like member 2 (having approximately parallel and smooth surfaces 48 and 51) of an inorganic or organic material. In this configuration shown in FIGS. 5A, 5B and 5C, the top surface 51 is the magnification surface and the bottom surface 48 is the reduction surface, as mentioned above. The respective high-refractive-index regions 31 having the refractive index higher than that of the low-refractive-index region 32 and extend between the bottom surface 48 to the top surface 51 independently. It is preferable that the space between the adjacent high-refractive-index regions is as small as possible. As can be seen from FIGS. 5A through 5C, the sectional area of each high-refractive-index region 31 on a plane perpendicular to the thickness direction of the plate-shaped member 2 is larger in the top surface than in the bottom surface in a desired ratio. Thereby, each high-refractive-index region 31 has a tapered shape expanding toward the magnification surface 51. There, as shown in FIGS. 5A and 5B, the relative positional relationship between the respective high-refractive-index regions 31 on the reduction surface 48 is also maintained on the magnification surface 51. Also, the ratio of the sectional area on the reduction surface 48 to that on the magnification surface 51 is approximately uniform for the respective high-refractive-index regions 31.

Figure 6:
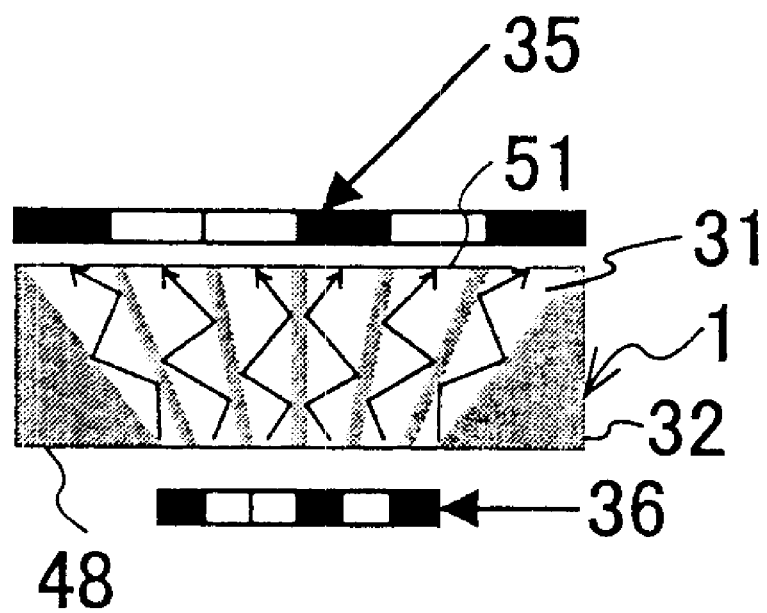
FIGS. 6, 7, 8A and 8B illustrate principles of a modified configuration of the basic configuration of the present invention.

FIG. 6 shows a principle of the two-dimensional image magnifying/reducing optical device 1 in the first embodiment of the present invention described above.

In this embodiment, as shown in FIG. 6, a display device 36 on which a display image to be magnified is displayed is placed below this optical device 1. Specifically, the display image is an image displayed on a small-sized liquid-crystal display device, a small-sized electro-luminescence (EL)

display device, a small-sized CRT, or the like. A light emitted from this display device 36 is incident on the bottom surface 48 of the high-refractive-index region 31 of the optical device 1. The incident light which satisfies a total reflection requirement on an interface between the high-refractive-index region 31 and low-refractive-index region 32 is transmitted by the high-refractive-index region 31 upward. As the area of the high-refractive-index region 31 on the top surface 51 of the optical device 1 is larger than that on the bottom surface 48 of the optical device 1 as mentioned above, each pixel incident on the high-refractive-index region 31 on the bottom surface of the optical device 1 is magnified by the high-refractive-index region 31 and then displayed on the high-refractive-index region 31 on the top surface of the optical device 1. Thus, the entire image is magnified, and, also, each pixel itself thereof is magnified. Reversely, when a display device 35 on which an image to be reduced is placed above the top surface of the optical device 1, this image is reduced by the high-refractive-index region 31 and then displayed on the high-refractive-index region 31 on the bottom surface of the optical device 1 by the same principle.

Figure 7:
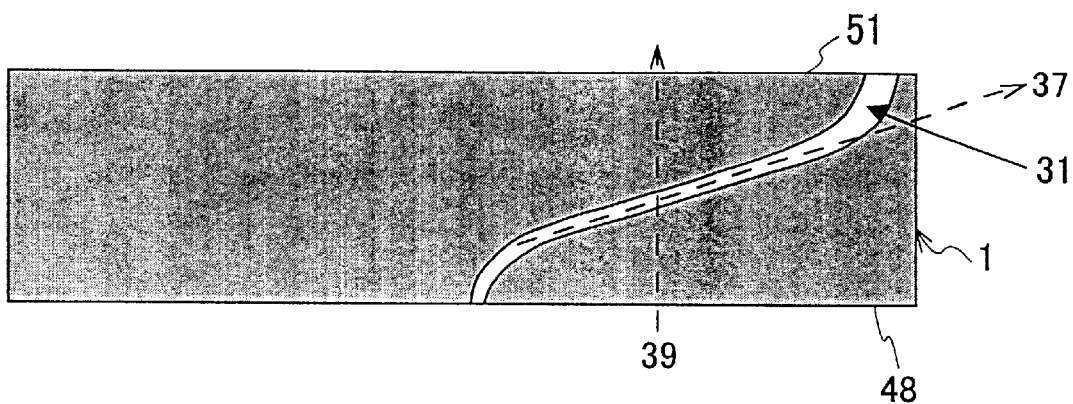

This optical device 1 in the first embodiment of the present invention has an advantage in that it is possible to elongate a light path used when an image is magnified/reduced, by enlarging an angle between the light path (fiber 31) and the normal of the reduction surface 48 to be inclined much, as shown in FIG. 7. That is, it is possible to reduce the thickness of the optical device 1 with respect to the magnification/reduction ratio thereof. As mentioned above, the product on sale having the trade name of "TaperMag" is manufactured by bundling glass fibers. Accordingly, it is difficult to increase the tapering angle in a working process thereof to form a tapered shape. As a result, it is not possible to reduce the thickness of the device to a thickness shorter than the diagonal length of a magnification surface thereof in this prior art.

FIG. 7 shows a side-elevational sectional view of an optical device 1 for illustrating the principle of the above-described first embodiment of the present invention.

As shown in FIG. 7, according to the above-described aspect of the present invention, with regard to one high-refractive-index region 31 of the optical device 1, it is possible to increase an angle between a normal 39 of the (plate-shaped) device 1 and a direction 37 in which incident light is transmitted by the high-refractive-index region 31. As a result, it is possible to reduce the thickness of the device 1 for magnifying an image. In the case where the cross section of the high-refractive-index region 31 taken along a plane parallel to the plate-shaped optical device is similar throughout the longitudinal axis of fiber (high-refractive-index region), that is, the cross-sectional area of the fiber varies in proportion to a position along the normal of the plate-shaped optical device 1 as in the first embodiment shown in FIG. 5C, an angle between the axial direction of the fiber 31 and the normal 39 of the device is increased as the magnification/reduction ratio is increased, and, as a result, the cross-sectional area of the fiber 31 should become very smaller along the direction along which light is transmitted. This may be problematic. In order to solve this problem, in a modified embodiment of the first of the present invention, as shown in FIG. 7, the fiber (high-refractive-index region) 31 has a tapered shape only in the vicinity of the magnification surface (top surface in FIG. 7) 51 of the optical device 1, but has an approximately fixed cross-sectional area in the vicinity of the reduction surface (bottom surface) 48, and, also, for a position in which the angle between the axial line of the fiber 31 and the normal 39 is not less than 45°. Thereby, it is possible to reduce the thickness of the optical device 1 to the necessary and minimum one. Further, by further reducing the cross-sectional area of the fiber 31 to be smaller than the area thereof on the reduction surface (bottom surface) of the optical device for a position in which the angle between the axial direction of the fiber 31 and normal 39 of the optical device 1 is not less than 45°, it is possible to further reduce the thickness of the optical device 1.

However, in order to control wavelength dispersion, it is preferable that the diameter of each fiber 31 is not less than 1 μm.

However, as light emitted from a pixel has a directivity, it is preferable that the angle between the direction in which the light is incident on the bottom surface 48 of the optical device 1 and the normal 39 of the optical device 1 is approximately uniform among the respective high-refractive-index regions 31 in the vicinity of the bottom surface on which the original image is incident, as will be described.

Figure 8A:
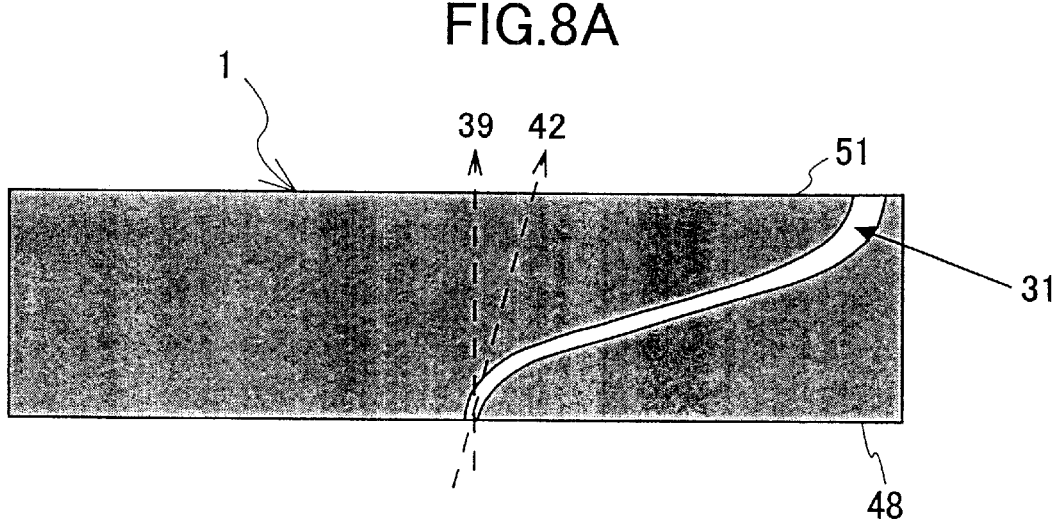
Figure 8B:
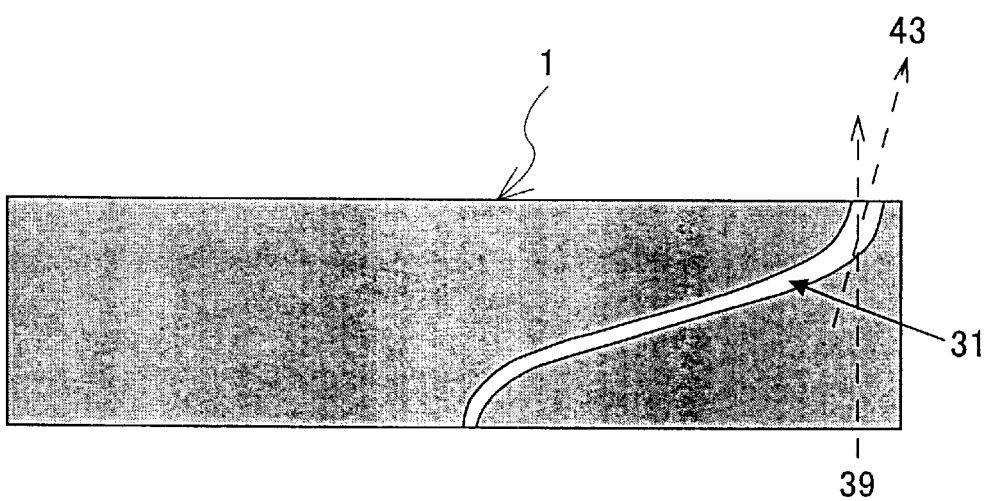

FIG. 8A shows the side-elevational sectional view of the optical device 1 in which a direction 42 in which light is incident on the device 1 while FIG. 8B shows the side-elevational sectional view of the optical device 1 in which a direction 43 in which light exists from the device 1 is shown.

In the vicinity of the bottom surface of the optical device 1, as shown in FIG. 8A, on which an original image is incident, it is preferable that the angle between the direction 42 along the axial direction of the high-refractive-index region 31 in which the light is incident on the optical device 1 in the vicinity of the bottom surface 48 and the normal 39 of the optical device 17 is smaller, that is, the directions of the vectors 42 and 39 are similar to or the same as one another.

Specifically, it is preferable that the angle between the cross-section-center-axis line 42 of each fiber 31 in the vicinity of the bottom surface 48 in FIG. 8A and the normal of the bottom surface 48 is not larger than 30°.

Similarly, also on the top surface 51 of the optical device 1 through which light exits from the optical device 1, as shown in FIG. 8B, in order to eliminate view-angle dependency of a displayed image, it is preferable that the angle between the direction 43 along the axial direction of the high-refractive-index region 31 in the vicinity of the top surface 51 in which the light exists from the optical device 1 and the normal 39 of the optical device 1 is smaller, that is, the directions of the vectors 43 and 39 are similar to or the same as one another for each high-refractive-index region (fiber) 31.

The present inventors and so forth found out that, as a setting is made such that the following formula is satisfied:

$$n1^2 - n2^2 \geq 0.07$$

where n1 denotes the refractive index of the high-refractive-index regions 31, n2 denotes the refractive index of the low-refractive-index regions 32, it is possible to improve the efficiency of taking light into the reduction surface 48, and, also, to enlarge the spread of light exiting from the magnification surface 51, thereby, the image to be transmitted therethrough being rendered brighter, and, also, the angle of visibility being rendered enlarged, as being proved by evaluation of samples described later. Especially, by setting the refractive indexes n1 and n2 such that $$n1^2 - n2^2 \geq 0.25$$

the performance is further improved.

Figure 9A:
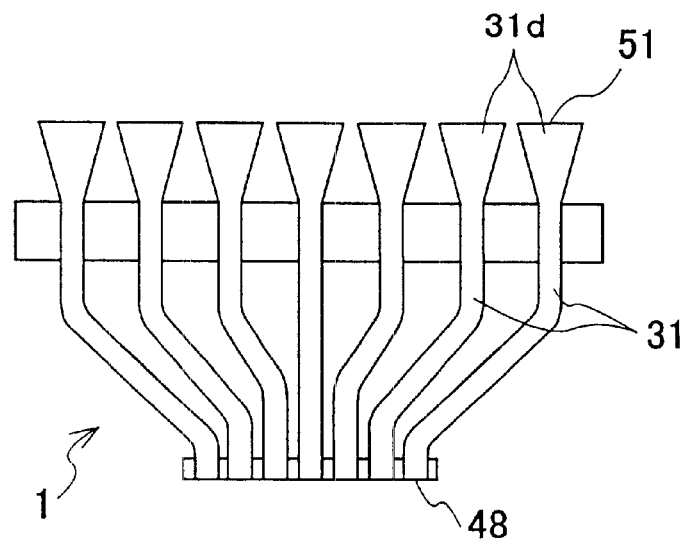
FIGS. 9A and 9B illustrate modified configurations of the basic configuration of the present invention.

Further, when the high-refractive-index region (fiber) 31 has a sectional shape in parallel to the reduction surface 48 similar from the reduction surface 48 through the magnification surface 51, the angle between the center-axis direction of the fiber 31 and the normal of the plate-shaped device 1 becomes very large as the magnification/reduction factor of the device 1 becomes larger. As a result, the cross-sectional area of the fiber 31 acting as a waveguide becomes very small. In order to solve this problem, as shown in FIG. 9A, the high-refractive-index region (fiber) 31 has an expanding tapered shape 31d in the vicinity of the magnification surface 51. Thereby, it is possible to effectively reduce the thickness of the device 1 to the minimum one.

Figure 9B:
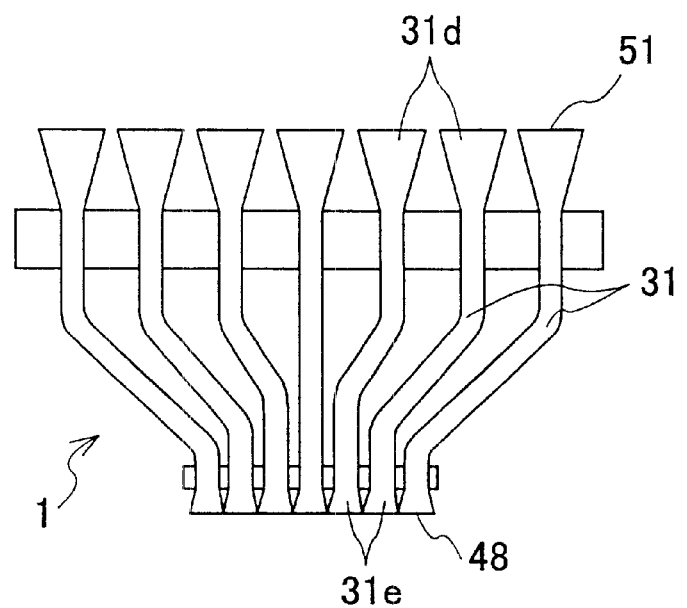

Furthermore, it was found out that the thickness of the above-mentioned optical device 1 is determined by a part of the high-refractive-index region 31 other than the tapered part 31d. Accordingly, in a part of the device in which the angle between the center-axis direction of the high-refractive-index region (fiber) 31 and the normal of the plate-like device 1 is not smaller than 45° so as to reduce the thickness of the device, the diameter of the fiber 31 is made smaller than that on the reduction surface 48 as shown in FIG. 9B. Thereby, it is possible to further effectively reduce the thickness of the device 1, and, also, it is easy to bundle the fibers 31 during a manufacturing process of the device 1. For example, in a case of the device in which the magnification/reduction factor is 10, and the number of fibers 31 is 4000×4000, it is possible to halve the thickness of the device approximately in proportion to the diameter of each fiber 31, by rendering the diameter of each fiber 31 half. Thus, as the diameter of each fiber 31 becomes smaller, the thickness of the device can be rendered smaller. However, in order to avoid wavelength dispersion, it is preferable to render the diameter of each fiber 31 not smaller than 1 $\mu$m. Furthermore, in a case where not less than ten million pixels are output or taken in at 200 dpi, according to a simulation, it was found out that the optical device having the thickness of not more than 4 cm can be yielded by satisfying the following formula (4):

$$b < 252/(1-X) \qquad (4)$$

where:
- b ($\mu m^2$) denotes a cross-sectional area of at least a part of each high-refractive-index region (fiber) 31 other than both end parts thereof; and
- X denotes a value obtained from dividing a cross-sectional area of each high-refractive-index region (fiber) 31 on the reduction surface 48 by that on the magnification surface 51 (X<1).

Figure 10:
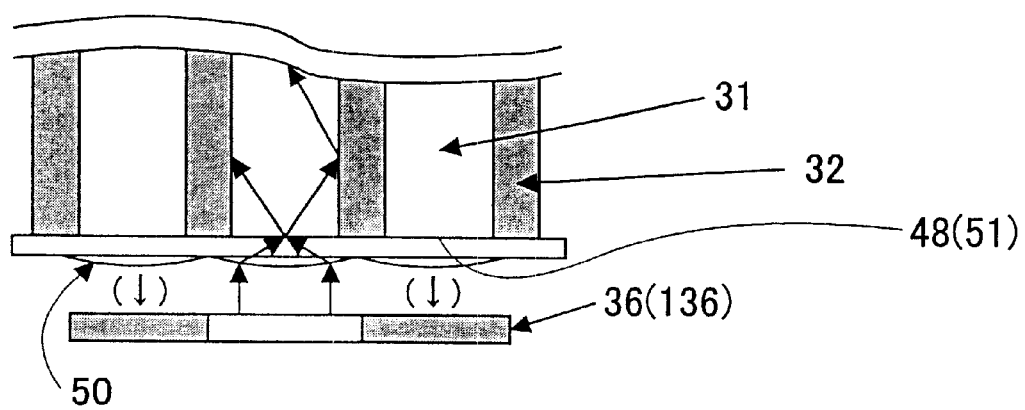
FIG. 10 illustrates another modified configuration of the basic configuration of the present invention.

FIG. 10 shows an another modified embodiment of the first embodiment of the present invention. In this modified embodiment, a micro-lens array 50 is provided so as to face the bottom surface 48 of the optical device 1. Thereby, it is possible to increase an efficiency of taking light from an original image 36 into the high-refractive-index region 31 even if a light intensity emitted from the original image 36 is weak. Furthermore, by providing a light absorbing layer or a metal thin film on a side surface of each fiber 31 by vapor deposition, it is possible to avoid stray light, and to obtain a magnified/reduced image having a satisfactory contrast.

Figure 11:
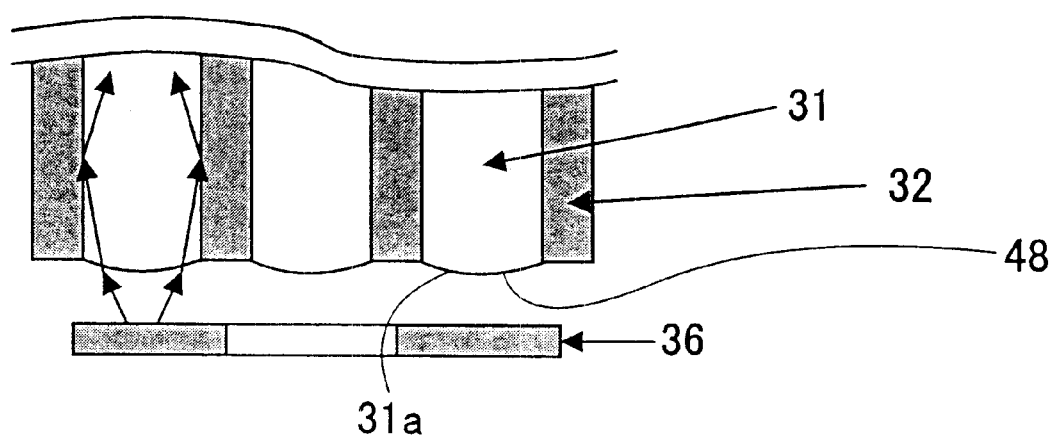
FIG. 11 illustrates another modified configuration of the basic configuration of the present invention.

When the directivity of light emitted from an original image 36 to be magnified is problematic, it is possible to improve efficiency in taking the light into the high-refractive-index region 31 by rendering the end surface (on which the light is incident) of the high-refractive-index region 31 convex on the bottom surface 48, as shown in FIG. 11. Thereby, the efficiency of taking light emitted from the display device 36 into the reduction surface 48 is further improved by a light collecting performance of the convex part 31a. Thereby, the transmitted image is rendered further bright.

Figure 12A:
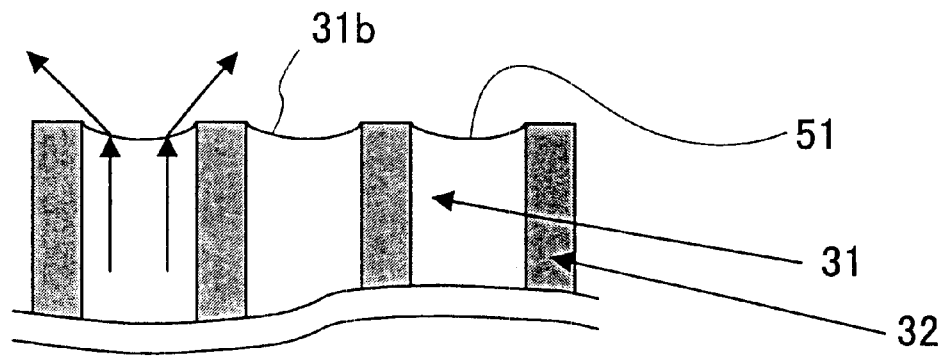
FIGS. 12A and 12B illustrate other modified configurations of the basic configuration of the present invention.
Figure 12B:
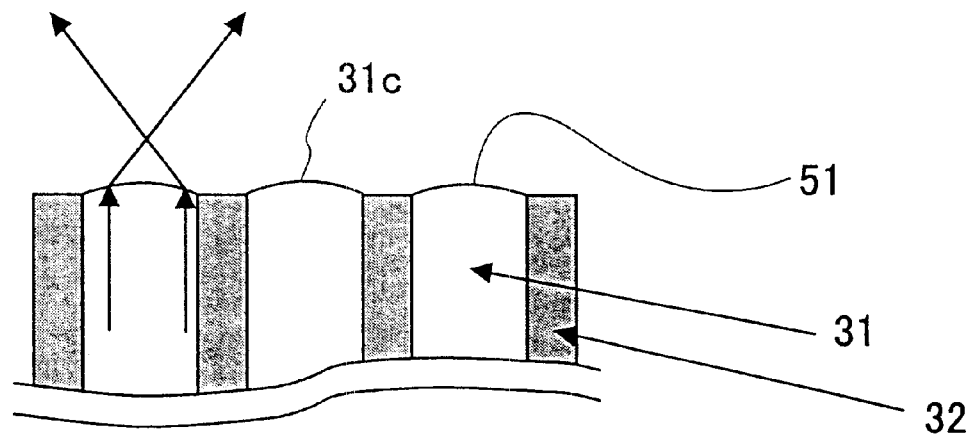

FIGS. 12A and 12B show other modified embodiments of the first embodiment of the present invention. In FIG. 12A, the end surface of each high-refractive-index region 31 has a concave or depressed shape on the top surface 51 of the optical device 1, while, in FIG. 12B, the end surface of each high-refractive-index region 31 has a convex or projected shape on the top surface 51 of the optical device 1. In each modified embodiment, it is possible to increase the angle of visibility of a magnified image.

In order to manufacture the above-described first embodiment, and other modified embodiments thereof, of the present invention, as one example, a plurality of tapered fibers are formed simultaneously as a result of light having high directivity being incident into a solution in which photo-curing resin is mixed, from a fiber bundle, and these tapered fibers are bundled. Further, by using a concave/convex substrate when forming the plurality of tapered fibers, by applying the light beams to this substrate through the photo-curing resin mixed solution, as will be described with reference to FIGS. 16 and 17, for example, it is possible to obtain the tapered fibers having concave/convex end surfaces (shown in FIGS. 11, 12A and 12B).

The above-mentioned photo-curing resin is, for example, acrylic one, methacrylate one, or the like. In order to bundle the fibers with avoiding the arrangement of the respective fibers into disarrangement, an elastic or shrinkable mesh sheet may be used. In this method, the light from the fiber bundle is incident on the photo-curing-resin mixed liquid via this mesh sheet in a expanded state of the sheet. Then, after the fibers are formed thereby, the sheet is rendered shrunk, and, thus, the fibers are bundled automatically. Thereby, it is possible to obtain the image-distortion-free optical device 1. This elastic or shrinkable mesh sheet may be made of a rubber, a high-polymer gel (for example, crosslinked material of poly (metha) acrylic acid, metal salt thereof, crosslinked material of polyvinyl sulfonic acid, crosslinked material of polyalkyl-substituted (metha) acrylamide, crosslinked material of amino-substituted (metha) acrylamide, crosslinked material of hydrophilic high polymer compound of triallyl methane derivative, spirobenzopyran derivative or the like), heat shrinkable sheet (for example, a heat shrinkable multi-layer film in which layers of polyolefin resin, polyamide resin, vinylidene chloride resin, ethylenevinylalcohol copolymer resin, ethylene-vinyl acetate copolymer resin, denatured polyolefin resin or the like are laminated in various manners, or the like).

FIGS. 13A, 13B, 14A, 14B and 15 illustrate an example of manufacturing method of the above-mentioned first embodiment, or any of modified embodiments thereof, of the present invention.

(Step 1)

Figure 13A:
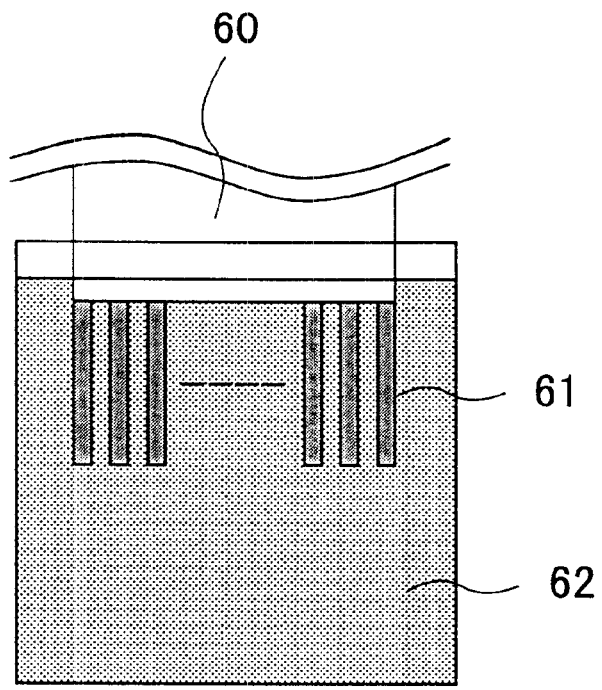
FIGS. 13A, 13B, 14A, 14B and 15 illustrate a manufacturing process for an image magnifying/reducing optical device according to the present invention.
Figure 13B:
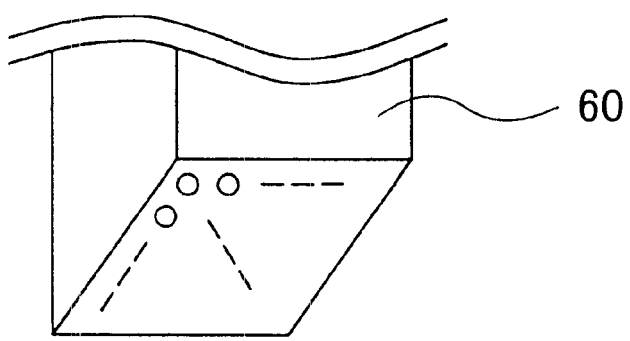

First, in a step 1, as shown in FIGS. 13A and 13B, multi-mode fibers 60 (core/clad=70/90 $\mu$m) are arranged into 7×7 with intervals of 250 $\mu$m, and one end thereof is immersed into photo-curing resin mixed solution 62 of phenoxy ethylene acrylate. The light from an extra-high pressure mercury lamp is applied into the solution 62 through the fibers 62. As a result, 7×7 pieces of fibers 61 are formed simultaneously from the immersed end of the fibers 60 each having a diameter of 100 μm along the light paths by photopolymerization reaction. After the formation of the fibers 61, the non-cured resin part 62 is removed by acetone. Then, a clad layer is formed on each fiber 61 by heat curing of epoxy fluoride which has a refractive index lower than that of the above-mentioned photo-curing resin 62 so that the diameter of each fiber 61 becomes 140 μm.

(Step 2)

Figure 14A:
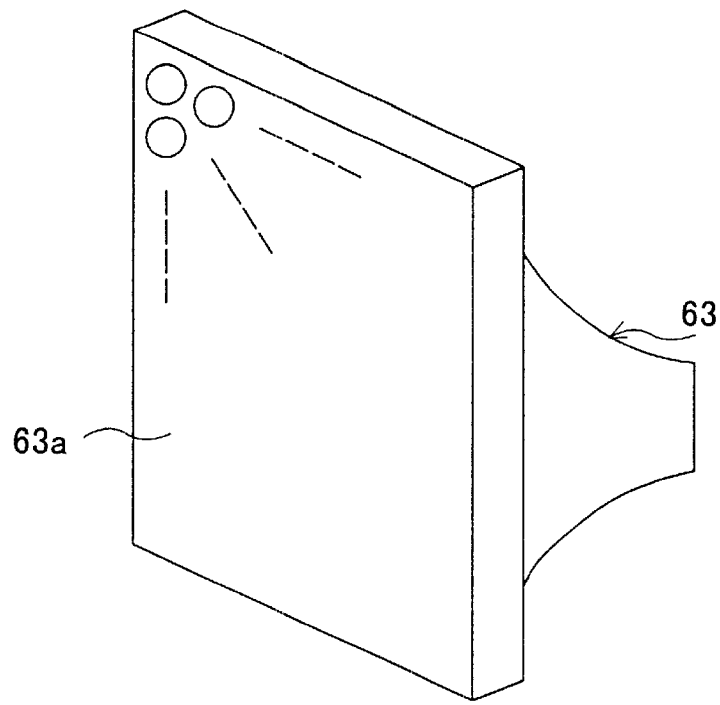
Figure 14B:
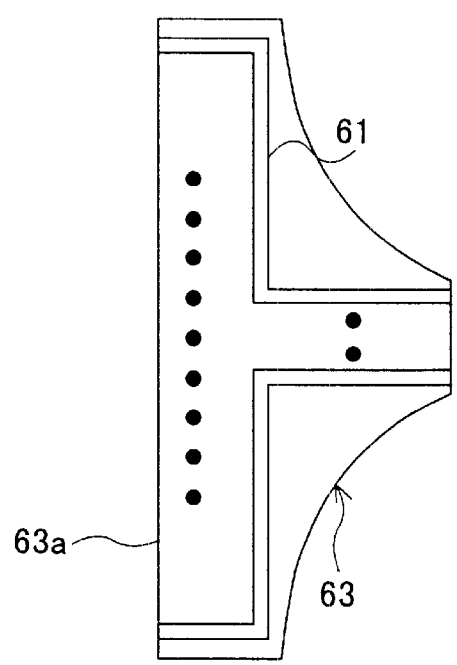

Then, in a step 2, after that, 5 millimeters of one end of each fiber 61 thus obtained is disposed so that the center-axis line of the fiber 61 becomes perpendicular to a magnification surface 51, and, is fixed to a position such the fibers 61 are arranged with the previously set intervals of 250 μm by heat curing after these parts of the fibers 61 are immersed into the resin solution same as that of the above-mentioned clad layer. Then, the other ends of the fibers 61 are bundled while the fibers are bent so that they are arranged with no intervals, the center-axis line of each thereof becomes perpendicular to a reduction surface 48, the thickness of the entire optical device becomes minimum, and, also, the arrangement is avoided from being disarranged. Then, similarly, they are fixed by heat curing of the resin solution, as shown in FIGS. 14A and 14B.

(Step 3)

Then, in a step 3, light from an extra-high pressure mercury lamp is incident onto the highest density end of a thus-obtained fiber bundle 63 while the other end thereof in which the fibers 61 are arranged with the intervals of 250 μm is immersed into photo-curing resin mixed solution of phenoxy ethylene acrylate. As a result, by photopolymerization reaction, curing reaction occurs, and, then, 2-millimeter-length expanding tapered fibers 63A are formed automatically. Thus, finally, the diameter of each fiber 61 becomes 200 μm. After that, non-cured resin part is removed by acetone, and, then, a clad layer of epoxy fluorine having a refractive index lower than that of the above-mentioned photo-curing resin is formed on each fiber by heat curing.

Figure 15:
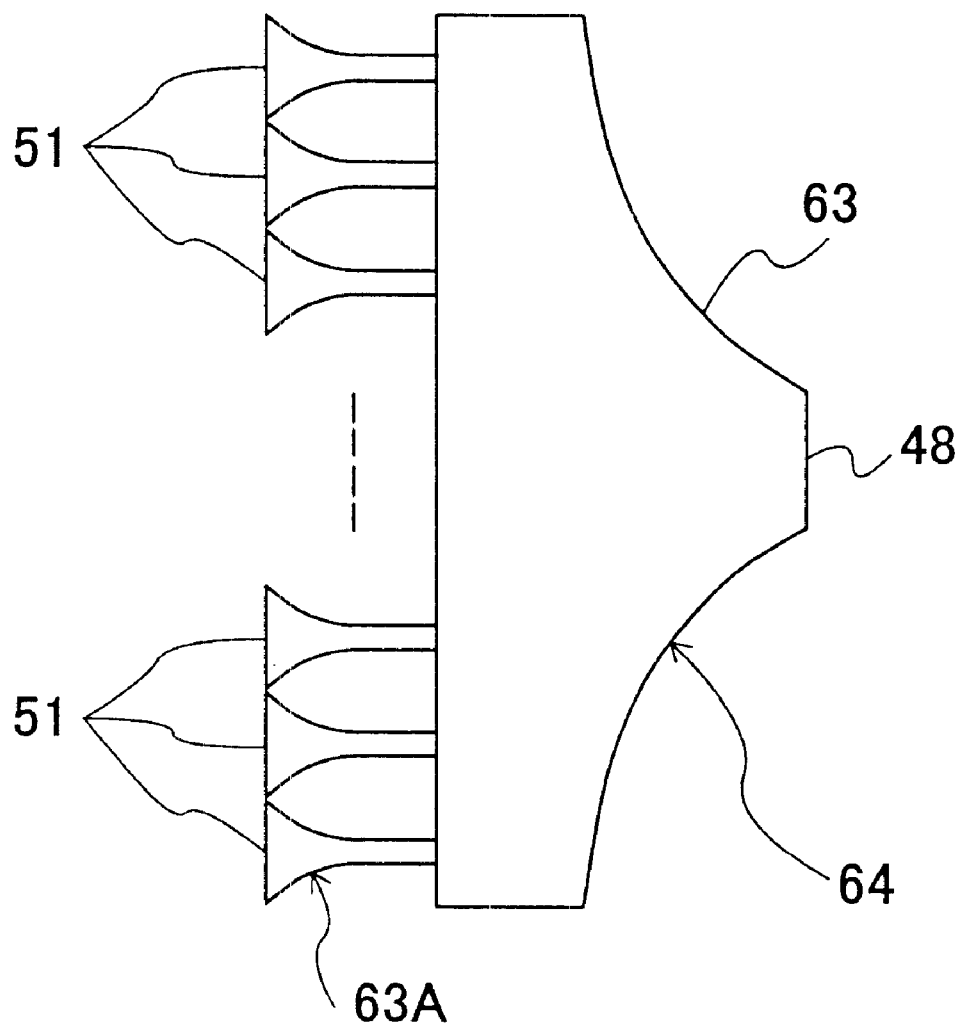

Thus, a thin image magnifying/reducing optical device 64 having a thickness of 10 mm, a magnification factor of 2, and a length lx of each fiber 61 in accordance with the following formula (1) is obtained as the above-mentioned first embodiment of the present invention, as shown in FIG. 15. The thus-obtained device 64 is referred to as a sample 1.

$$t(n+1)\left(\sqrt{\frac{\sum_{a=1}^{N} Sa}{\sum_{a=1}^{N} sa}} - 1\right) + l_{min} \geq lx \geq \frac{l_{min}}{\sin\theta} \quad (1)$$

where:

N denotes the total number of the fibers 61;

a denotes the number of each fiber;

Sa denotes the area of the end surface of the fiber/high-refractive-index region a on the magnification surface 51;

sa denotes the area of the end surface of the fiber/high-refractive-index region a on the reduction surface 48;

$l_{min}$ denotes the length of the shortest fiber;

t denotes the averaged fiber interval on the reduction surface 48;

n denotes the number of fibers present between the relevant fiber and the shortest fiber; and θ denotes an angle of the straight line passing through the position of the relevant fiber on the reduction surface and the position of the same fiber on the magnification surface with respect to the reduction surface.

For obtaining the modified embodiment shown in FIG. 10, the micro-lens array 50 is disposed, having an arrangement of lens parts with the intervals of 250 μm corresponding to the above-mentioned fiber arrangement on the surface 48 of the above-mentioned sample 1 (64) shown in FIG. 15 which an original image 36 to be magnified is placed so as to face. A thus-obtained device 1 in the modified embodiment shown in FIG. 10 is referred to as a sample 2.

In order to obtain another modified embodiment mentioned above, after the clad layers are formed on the primarily formed fibers 61 and after the clad layers are formed on the secondarily formed tapered fibers 63A in the above-mentioned sample 1 shown in FIG. 15, both end surfaces of the fibers are masked, and, then, in this state, the entire device is immersed into black paint. Then, the masks are removed after the paint is dried. Thus, an optical device 1 in the modified embodiment in which only side walls of the fibers are coated with thus-formed light absorbing layers is obtained. The thus-obtained device is referred to as a sample 3.

Similarly, in order to obtain another modified embodiment mentioned above, after the clad layers are formed on the primarily formed fibers 61 and after the clad layers are formed on the secondarily formed tapered fibers 63A in the above-mentioned sample 1 shown in FIG. 15, both end surfaces of the fibers are masked, and, then, in this state, the entire device is set into a gold vapor deposition apparatus, and, then, gold is vapor-deposited thereon by 500 Å. Then, after than, the masks are removed. Thus, an optical device in the modified embodiment is obtained. The thus-obtained device is referred to as a sample 4.

Figure 17:
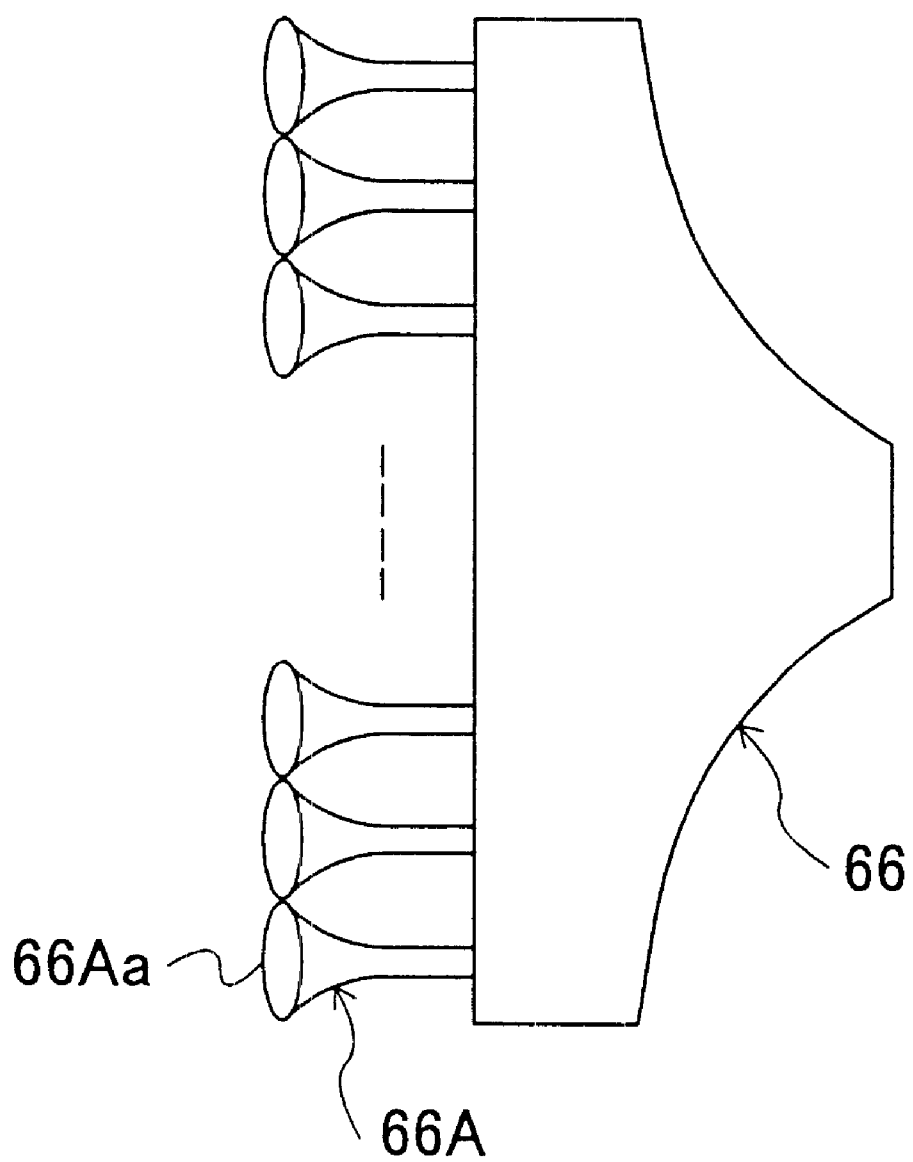

In order to obtain another modified embodiment mentioned above with reference to FIG. 12B, in the above-mentioned step 3 of the manufacturing method, a transparent concave substrate 65 having many concave parts arranged with intervals of 250 μm corresponding to the above-mentioned fiber arrangement is disposed apart from the surface 63a on the side of the magnification surface of the fiber bundle 63 shown in FIGS. 14A and 14B by 2 millimeters. Then, similar to the above-mentioned step 3, the tapered fibers are formed as a result of light being applied into the solution. Then, after that, the transparent concave substrate 65 is removed. Thereby, tapered fibers 66A having respective convex end surfaces 66Aa as shown in FIG. 17 are yielded. The thus-obtained optical device is referred to as a sample 5.

Figure 18A:
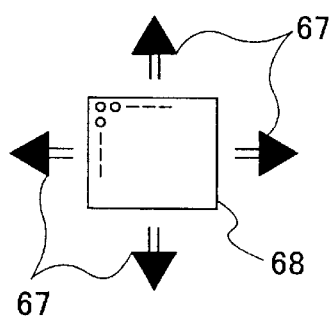
FIGS. 18A, 18B and 19 illustrate another modified manufacturing process for an image magnifying/reducing optical device according to the present invention.
Figure 18B:
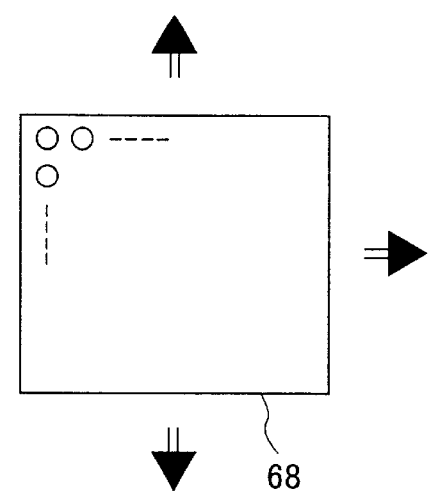
Figure 19:
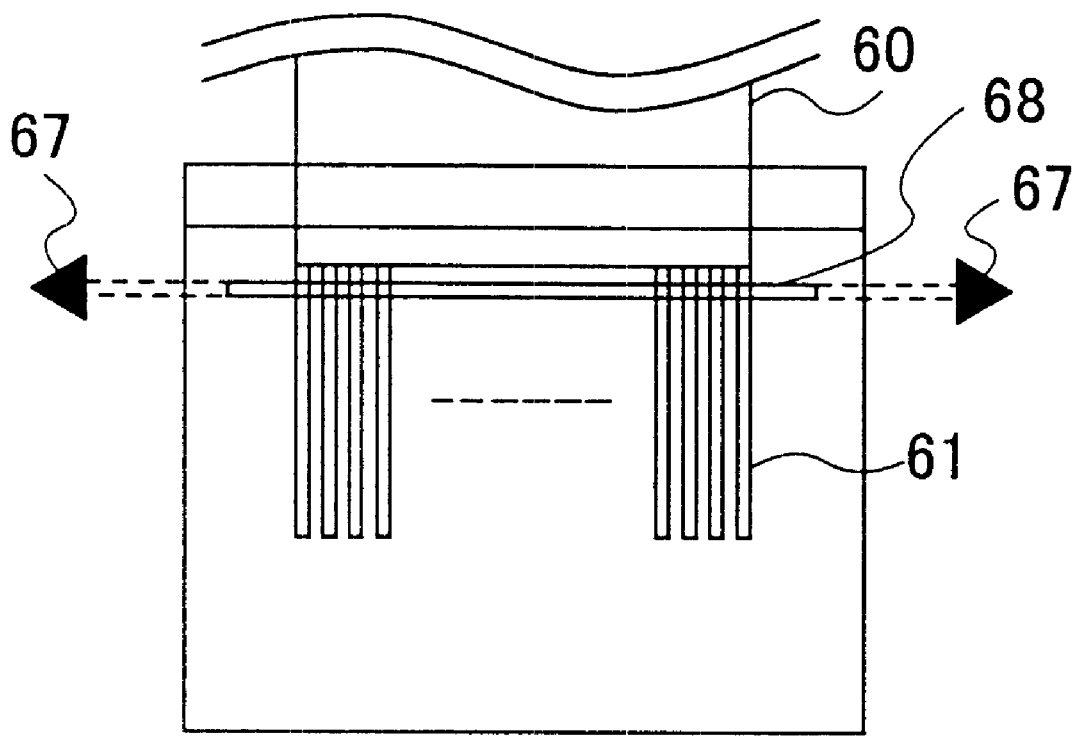

An above-mentioned modified embodiment of the above-described manufacturing method will now be described with reference to FIGS. 18A, 18B and 19.

In this modified embodiment of the manufacturing method, in a process in which the fibers 61 are bundled in the above-mentioned step 2 described with reference to FIGS. 14A and 14B, an elastic rubber sheet 68 is used. As shown in FIG. 18A, tensions 67 are applied to the elastic sheet 68 having 7×7 minute holes each having a diameter of 15 μm with intervals of 25 μm, and, as a result, the area of the rubber sheet 68 is expanded, as shown in FIG. 18B, so that each hole comes to have a diameter of 150 μm and the holes are arranged with intervals of 250 μm. As a result, light emitted from the above-mentioned multi-mode fiber bundle 60 can pass therethrough. Then, as shown in FIG. 19, light from the multi-mode fiber bundle 60 is applied into the photo-curing resin mixed solution via this rubber sheet 68.

Thus, same as in the above-mentioned step 1 described with reference to FIGS. 13A and 13B, the fibers 61 are formed.

Then, in the above-mentioned step 2, the tensions 67 applied to the rubber sheet 68 are reduced gradually, and the thus-formed fibers 61 are bundled automatically. Thereby, it is possible to bundle the fibers 61 easily without occurrence of disarrangement of the arrangement of the fibers 61. The other parts of the manufacturing method are the same as those described above with reference to FIGS. 13A, 13B, 14A, 14B and 15. Thus, the optical device, similar to the above-mentioned optical device 64 shown in FIG. 15, having the thickness of 10 mm and the magnification factor of 2 is obtained. This device is referred to as a sample 6.

Another sample of an optical device 1 is produced as will now be described. In this case, the sample of the optical device is produced according to the manufacturing method described above with reference to FIGS. 13A, 13B, 14A, 14B and 15. However, in this case, the optical device is such that the center-axis line of each fiber 61 is inclined from the normal of a respective one of the reduction surface and magnification surface of the optical device in the vicinity of each of the reduction surface and magnification surface, by not smaller than 45° at the maximum. This sample is referred to as a sample 7.

Another sample of an optical device is produced as will now be described. In this case, the sample of the optical device is produced according to the manufacturing method described above with reference to FIGS. 13A, 13B, 14A, 14B and 15. However, in this case, the optical device is such that the length ln of each fiber 61 is accordintg to the following formula (2):

$$t(n+1)\left(\sqrt{\frac{\sum_{a=1}^{N} Sa}{\sum_{a=1}^{N} sa}} - 1\right) + l_{min} < l_n \quad (2)$$

The thus-obtained sample is a sample 8.

Another sample of an optical device is produced as will now be described. In this case, the sample of the optical device is produced according to the manufacturing method described above with reference to FIGS. 13A, 13B, 14A, 14B and 15. However, in this case, the optical device is such that the length ln of each fiber is accordintg to the following formula (3):

$$l_n < \frac{l_{min}}{\sin\theta} \quad (3)$$

The thus-obtained sample is a sample 9.

Figure 20:
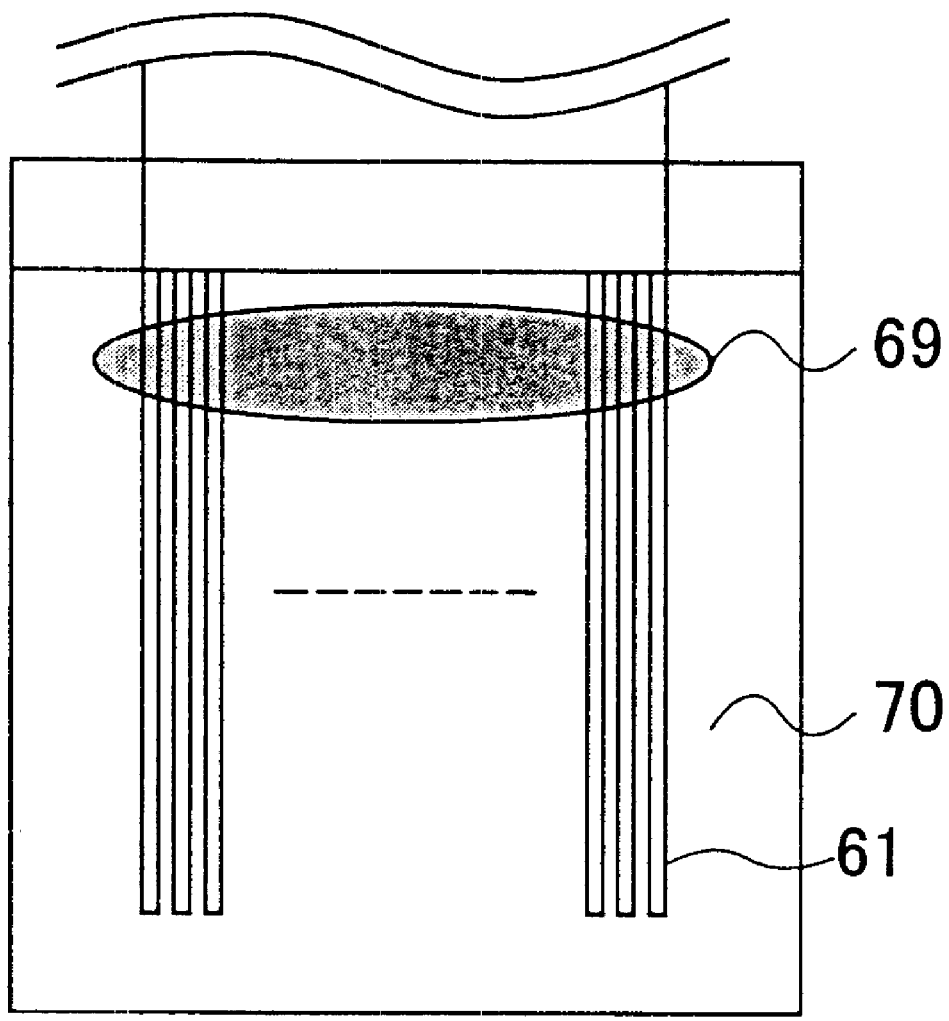
FIG. 20 illustrates another modified manufacturing process for an image magnifying/reducing optical device according to the present invention.

Another modified embodiment mentioned above of the manufacturing method described above with reference to FIGS. 13A, 13B, 14A, 14B and 15 will now be described with reference to FIG. 20.

In this method, a high polymer gel 69 is used in the above-mentioned step 2 of the manufacturing method described with reference to FIGS. 14A and 14B in which the fibers 61 are bundled.

First, polymerization is rendered by using acrylic acid as a main monomer and a methylenebisacrylamide as a crosslinking agent. Thus, the high polymer gel sheet 69 is produced. Then, this high polymer gel sheet 69 is immersed into a solution 70 which is set to have a pH of approximately 7.0. Then, after the high polymer gel sheet 69 enters the saturated swelling state, the fibers 61 are caused to pierce it, as shown in FIG. 20. Then, the pH of this solution 70 is changed into approximately 3.0, and, thereby, the high polymer gel sheet 69 shrinks. Thereby, the fibers 61 are automatically bundled without occurrence of disarrangement of the arrangement thereof. The other parts of the manufacturing method are the same as those described above with reference to FIGS. 13A, 13B, 14A, 14B and 15. Thus, the optical device, similar to the above-mentioned optical device 64 shown in FIG. 15, having the thickness of 10 mm and the magnification factor of 2 is obtained. This device is referred to as a sample 10.

Furthermore, in the above-mentioned process described with reference to FIGS. 16 and 17, instead of using the transparent concave substrate 65, a transparent convex substrate having many convex parts arranged with intervals of 250 μm corresponding to the above-mentioned fiber arrangement is used. Thereby, the optical device in the modified embodiment, similar to the optical device 66 shown in FIG. 17, but the end surfaces of the fibers 61 on the magnification surface are such as those shown in FIG. 12A is obtained. This device is referred to as a sample 11.

For the above-mentioned samples 1 through 11, evaluation was made for ① brightness of a magnified image, ② uniformity of brightness of the magnified image, ③ contrast of the magnified image, ④ angle of visibility of the magnified image, and ⑤ time required for the production. The result of the evaluation is shown below:

| Sample No. | ① Brightness | ② Uniformity in Brightness | ③ Contrast | ④ Angle of Visibility | ⑤ Production Time |
|---|---|---|---|---|---|
| 1 | Δ | Δ | Δ | Δ | 100% |
| 2 | ○ | Δ | Δ | Δ | 105% |
| 3 | Δ | Δ | ○ | Δ | 105% |
| 4 | Δ | Δ | ○ | Δ | 101% |
| 5 | Δ | Δ | Δ | ○ | 110% |
| 6 | Δ | Δ | Δ | Δ | 60% |
| 7 | × | × | Δ | Δ | 90% |
| 8 | × | × | × | × | 100% |
| 9 | Δ | × | × | × | 100% |
| 10 | Δ | Δ | Δ | Δ | 50% |
| 11 | Δ | Δ | Δ | ○ | 110% | where the ⑤ production time is expressed by percentage assuming that the production time for the sample 1 is 100%. Further, ○, Δ, × of the above table denote the following criteria:

① Brightness:

○: (brightness of original image(cd/cm²))/(brightness of magnified image(cd/cm²))·(magnification factor (area ratio)) <2.0;

Δ: 2.0≦(brightness of original image(cd/cm²))/(brightness of magnified image(cd/cm²))·(magnification factor (area ratio))<3.0; and ×: 3.0≦(brightness of original image(cd/cm²))/(brightness of magnified image(cd/cm²))·(magnification factor (area ratio)).

② Uniformity in brightness:

○: variation in brightness of magnified image(cd/cm²) is smaller than ±10%;

Δ: variation in brightness of magnified image(cd/cm²) is not smaller than ±10% but smaller than ±30%; and ×: variation in brightness of magnified image(cd/cm²) is not smaller than ±30.

③ Contrast:

○: not less than 20;

Δ: not more than 5 but less than 20; and x: less than 5.
④ Angle of visibility:
○: not less than 90°;
Δ: not less than 30° but less than 90°; and
x; less than 30°.

With regard to the sample 1, light from the original image is somewhat lost by the low-refractive-index region. In contrast thereto, with regard to the sample 2, the light lost in the sample 1 is directed to the high-refractive-index region by the micro-lens array. Thereby, the brightness is improved, and, also, the contrast is improved in the sample 2.

With regard to each of the samples 3 and 4, the light absorbing layer or gold film is provided on the side wall of each fiber. Accordingly, no stray light from adjacent fibers occurs, and, as a result, the contrast is improved.

With regard to each of the samples 5 and 11, as the shape of the exit end surface of the high-refractive-index region is rendered convex or concave, the angle by which image light is dispersed/spread is increased. Thereby, in comparison to the sample 1, the angle of visibility is improved.

With regard to the sample 6, as many fibers can be easily bundled without occurrence of disarrangement of the fibers, the production time could be halved.

With regard to the sample 7, as the fiber center-axis line is inclined from the normal of each of the magnification surface and reduction surface in vicinity thereof by not less than 45° maximum, the efficiency in light incidence/entrance from the bottom surface 48 is degraded, and, also, as the center-axis direction of the light exiting from the top surface 51 is greatly inclined from the normal thereof, the brightness, and uniformity of brightness were degraded.

With regard to the sample 8, as the fiber length is increased, the device surface is rendered uneven, and, also, as the light path is rendered longer unnecessarily, the brightness was degraded.

With regard to the sample 9, as the fibers are too short, the device surface is also rendered uneven, the angle of visibility and uniformity in brightness were degraded.

As the lengths of the fibers are determined according to the above-mentioned formula (1) in the sample 1, the device surface is rendered smooth, and, the above-mentioned evaluation items were improved in comparison to the samples 8 and 9. Thus, it is preferable to conform to the formula (1).

With regard to the sample 10, it was possible to automatically bundle the fibers easily without disturbing the arrangement thereof, and, also, it was not necessary to apply a force to expand the sheet. Accordingly, the troublesomeness in producing the optical device could be effectively eliminated.

Figure 21:
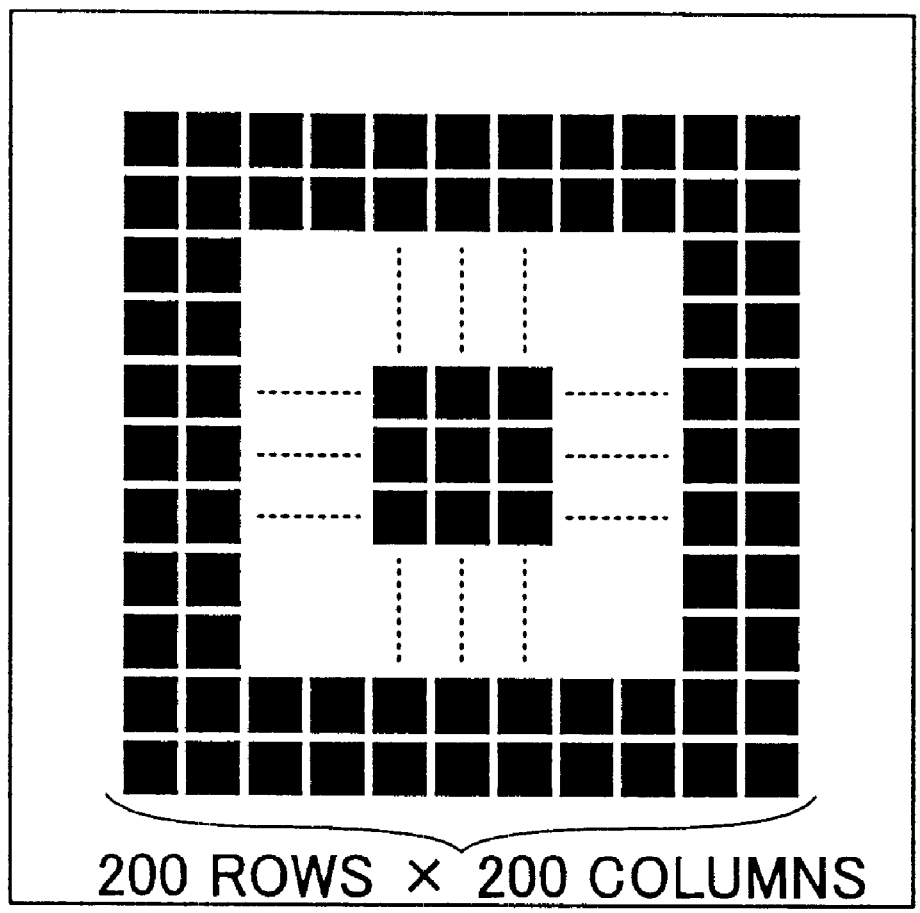
FIGS. 21 and 22 illustrate a photo mask used for manufacturing a second embodiment of the present invention.
Figure 22:
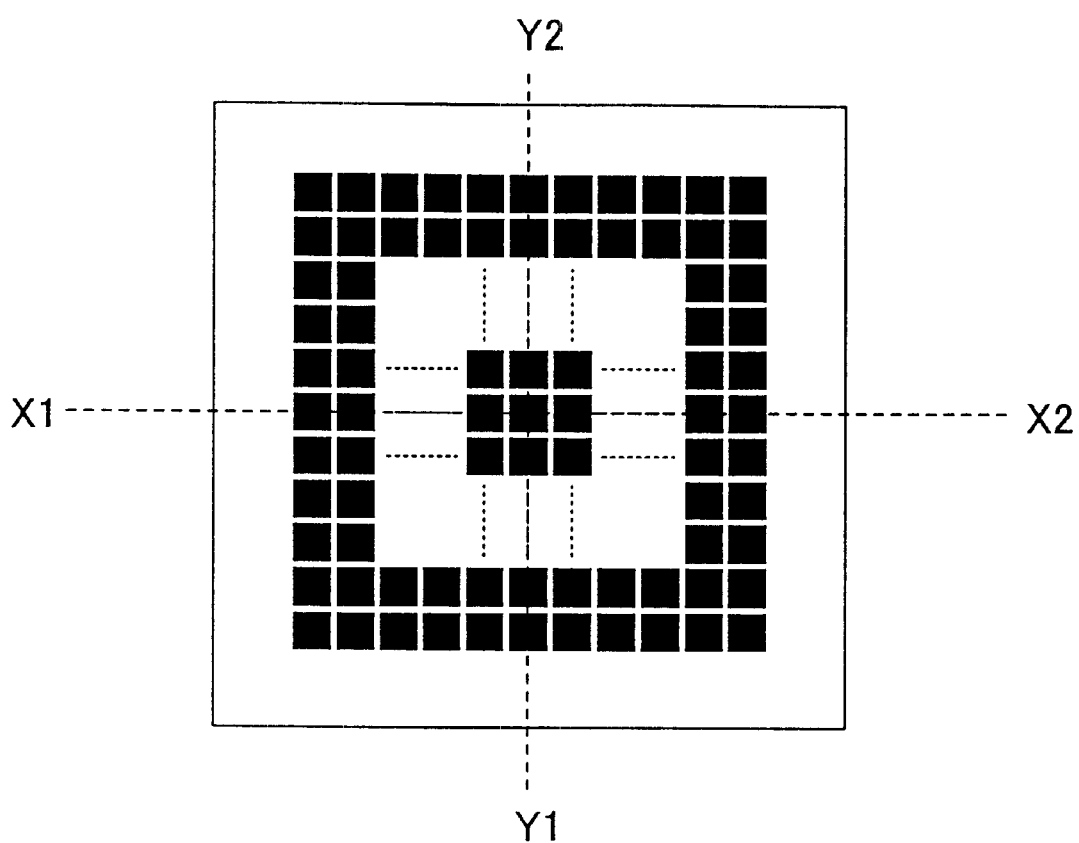

FIGS. 21 and 22 illustrate a method of producing a two-dimensional image magnifying/reducing optical device in a second embodiment of the present invention.

This optical device is manufactured by the following process:

First, 30 g of PMMA was solved into tetrahydrofuran, then, 10 g of phthalic anhydride was mixed thereinto uniformly. From this solution, a thin plate of 5 cm×5 cm having a thickness of 100 $\mu$m was formed by a cast method. Then, by applying ultraviolet ray having a wavelength of 0.33 $\mu$m from a rear surface of a mask having a pattern of 200 rows×200 columns of squires as shown in FIG. 21, using a lens, an image of the mask was formed on the above-mentioned thin plate. In this case, a length of one side of each square of the pattern imaged through the above-mentioned mask and lens onto the thin plate was 50 $\mu$m. Further, a separation between each adjacent squares was 10 $\mu$m. Furthermore, the center axis of the mask was aligned with the center axis of the thin plate. While the ultraviolet ray was thus applied to the thin plate, the temperature of the thin plate is 100° C., the intensity of the ultraviolet ray was 1 W/cm² on the thin plate, and a time for which the ultraviolet was applied thereto is 100 seconds. Photobreaching occurs on the thin plate at which the ultraviolet ray was applied, and, as a result, the refractive index thereof decreased. When the refractive index was measured, the refractive index at a part at which no ultraviolet had been applied (corresponding to the black regions of FIG. 21) was 1.50 while the refractive index at a part (corresponding to the white region of FIG. 21) at which the ultraviolet had been applied was 1.45.

By the same method as that described above, 50 thin plates were produced such that they are different in the length of one side of each square of the thus-imaged pattern through the mask and lens used from 51 $\mu$M through 100 $\mu$m in steps of 1 $\mu$m.

The thus-produced 51 thin plates were laminated together in a condition in which, as shown in FIG. 22, the center axes thereof are aligned together, that is, the coordinate of X1–X2 and Y1–Y2 coincides in the vertical direction. Then, the thus-obtained laminated plates were heated to 120° C. while a pressure of 2 kg/cm² was applied thereto uniformly. Thereby, fusion of the laminated plates occurred, and thus, they were bonded together. Thus, an optical device in the second embodiment of the present invention was obtained in which 40,000 separate high-refractive-index regions 31 are provided, and, the cross-sectional area of each high-refractive-index region on the top surface 51 is larger than that on the bottom surface 48, as shown in FIGS. 5A, 5B, 5C and 6. The thus-obtained device is referred to as a sample 21.

A third embodiment of the present invention will now be described. By the same method as that of the above-described second embodiment, 60 thin plates were produced. However, in this case, each of 9 thin plates thereof had the length of 50 $\mu$m of one side of each square of the imaged pattern through the mask and lens used while the other 51 thin plates were the same as those of the above-mentioned second embodiment.

Then, these 60 thin plates were laminated together in the order of the length of one side of each square of the imaged pattern through the mask and lens used. Then, the thus-obtained laminated plates were heated to 120° C. while a pressure of 2 kg/cm² was applied thereto uniformly. Thereby, fusion of the laminated plates occurred, and thus, they were bonded together. Thus, an optical device in the third embodiment of the present invention was obtained. This device is referred to as a sample 22.

A fourth embodiment of the present invention will now be described. By the same method as that of the above-described second embodiment, 60 thin plates were produced. However, in this case, each of 9 thin plates thereof had the length of 100 $\mu$m of one side of each square of the imaged pattern through the mask and lens used while the other 51 thin plates were the same as those of the above-mentioned second embodiment.

Then, these 60 thin plates were laminated together in the order of the length of one side of each square of the imaged pattern through the mask and lens used. Then, the thus-obtained laminated plates were heated to 120° C. while a pressure of 2 kg/cm² was applied thereto uniformly. Thereby, fusion of the laminated plates occurred, and thus, they were bonded together. Thus, an optical device in the third embodiment of the present invention was obtained. This device is referred to as a sample 23.

A fifth embodiment of the present invention will now be described. By the same method as that of the above-described second embodiment, 69 thin plates were produced. However, in this case, each of 9 thin plates thereof had the length of 50 μm of one side of each square of the imaged pattern through the mask and lens used, and, each of other 9 thin plates thereof had the length of 100 μm of one side of each square of the imaged pattern through the mask and lens used, while the other 51 thin plates were the same as those of the above-mentioned second embodiment.

Then, these 69 thin plates were laminated together in the order of the length of one side of one side of each square of the imaged pattern through the mask and lens used. Then, the thus-obtained laminated plates were heated to 120° C. while a pressure of 2 kg/cm² was applied thereto uniformly. Thereby, fusion of the laminated plates occurred, and thus, they were bonded together. Thus, an optical device in the third embodiment of the present invention was obtained. This device is referred to as a sample 24.

A sixth embodiment of the present invention will now be described. In this case, embossment is performed on the bottom surface of the above-mentioned sample 24 of the fifth embodiment such that, for each pixel, the end surface is rendered convex, as shown in FIG. 11. In this case, the radius of curvature of the convex shape is 50 μm. The thus-obtained device is referred to as a sample 25.

A seventh embodiment of the present invention will now be described. In this case, embossment is performed on the top surface of the above-mentioned sample 25 of the sixth embodiment such that, for each pixel, the end surface is rendered concave, as shown in FIG. 12A. In this case, the radius of curvature of the concave shape is 100 μm. The thus-obtained device is referred to as a sample 26.

An eighth embodiment of the present invention will now be described. In this case, embossment is performed on the top surface of the above-mentioned sample 25 of the sixth embodiment such that, for each pixel, the end surface is rendered convex, as shown in FIG. 12B. In this case, the radius of curvature of the convex shape is 100 μm. The thus-obtained device is referred to as a sample 27.

For the above-mentioned samples 21 through 27, evaluation was made for ① brightness of a magnified image, ② uniformity of brightness of the magnified image, ③ angle of visibility, and ④ uniformity of angle of visibility. The result of the evaluation is shown below:

| Sample No. | ① Brightness | ② Uniformity in Brightness | ③ Angle of Visibility | ④ Uniformity in Angle of Visibility |
|---|---|---|---|---|
| 21 | Δ within radius 60 mm from center: but × outside from radius of 60 mm | Δ within radius 60 mm from center: but × outside from radius of 60 mm | Δ | Δ within radius 60 mm from center: but × outside from radius of 60 mm |
| 22 | Δ | ○ | Δ | Δ within radius 60 mm from center: but × outside from radius of 60 mm |
| 23 | Δ within radius 60 mm from center: but × outside from radius of 60 mm | Δ within radius 60 mm from center: but × outside from radius of 60 mm | Δ | ○ |
| 24 | Δ | ○ | Δ | ○ |
| 25 | ○ | ○ | Δ | ○ |
| 26 | ○ | ○ | ○ | ○ |
| 27 | ○ | ○ | ○ | ○ | where as the original image to be magnified, an image obtained from projection of an ITE test chart produced on a transparent film by a color viewer was used. Further, ○, Δ, × of the above table denote the following criteria:

① Brightness:

○: (brightness of original image(cd/cm²))/(brightness of magnified image(cd/cm²))·(magnification (area ratio))<2.0;

Δ: 2.0≦(brightness of original image(cd/cm²))/ (brightness of magnified image(cd/cm²))·(magnification (area ratio))<3.0; and Δ: 3.0≦(brightness of original image(cd/cm²))/ (brightness of magnified image(cd/cm²))·(magnification (area ratio)).

② Uniformity in brightness:

○: variation in brightness of magnified image(cd/cm²) is smaller than ±10%;

×: variation in brightness of magnified image(cd/cm²) is not smaller than ±10% but smaller than ±30%; and ×: variation in brightness of magnified image(cd/cm²) is not smaller than ±30.

③ Angle of visibility:

○: not less than 90°;

Δ: not less than 30° but less than 90°; and

×; less than 30°.

④ Uniformity in angle of visibility:

○: variation in center of angle of visibility for pixel: smaller than ±10%;

Δ: variation in center of angle of visibility for pixel: not smaller than ±10% but smaller than ±30%; and ×: variation in center of angle of visibility for pixel: not smaller than ±30%.

In the evaluation, with regard to the sample 21, for brightness of the magnified image, uniformity of the brightness and variation in angle of visibility, outside of the radius 60 millimeter from the center of the optical device, the performance was not satisfactory. This is because, in the range outside of the radius 60 millimeter from the center, in the vicinity of the bottom surface and in the vicinity of the top surface of the optical device, the angle between the normal of the magnification/reduction surfaces and the center-axis line of the high-refractive-index region is large. Thereby, the efficiency in light incidence/entrance from the bottom surface is degraded, and, also, as the center-axis direction of the light exiting from the top surface is greatly inclined from the normal thereof, the uniformity of angle of visibility was also degraded. The measured values of the angle between the normal and the center-axis direction of the high-refractive-index region were approximately 30° for both the vicinity of the bottom surface and vicinity of the top surface at the position 60 millimeters apart from the center of the optical device in the sample 21. Accordingly, it is preferable that the angle between the normal of the plate-like optical device and the center-axis direction of the high-refractive-index region is not larger than 30° for both the vicinity of the bottom surface and vicinity of the top surface.

With regard to the sample 22, the angle between the center-axis direction of the high-refractive-index region and the normal of the optical device is small in the vicinity of the bottom surface of the optical device. Thereby, the brightness and uniformity of brightness outside of the radius of 60 millimeters from the center of the optical device were improved in comparison to the sample 21.

With regard to the sample 23, the angle between the center-axis direction of the high-refractive-index region and the normal of the optical device is small in the vicinity of the top surface of the optical device. Thereby, the uniformity in angle of visibility outside of the radius of 60 millimeters from the center of the optical device was improved in comparison to the sample 21.

With regard to the sample 24, the angle between the center-axis direction of the high-refractive-index region and the normal of the optical device is small in the vicinity of the top surface and also in the vicinity of the bottom surface of the optical device. Thereby, the brightness, uniformity of brightness, and, also, the uniformity in angle of visibility outside of the radius of 60 millimeters from the center of the optical device were improved in comparison to the sample 21.

With regard to the sample 25, as the end surface of the high-refractive-index region on the bottom surface of the optical device was rendered convex, the light entrance efficiency of the original image could be improved, and, as a result, the brightness was improved in comparison to the sample 24.

With regard to the sample 26, as the end surface of the high-refractive-index region on the top surface of the optical device was rendered concave, the light dispersion/spread angle of the magnified image could be improved, and, as a result, the angle of visibility was improved in comparison to the sample 25.

With regard to the sample 27, as the end surface of the high-refractive-index region on the top surface of the optical device was rendered convex, the light dispersion angle of the magnified image could be improved, and, as a result, the angle of visibility was improved in comparison to the sample 25.

Although, in each of the second through eighth embodiments, each high-refractive-index region has a square cross section, as shown in FIG. 21. By thus employing the square cross section, it is possible to reduce the space of the low-refractive-index region present between the adjacent high-refractive-index regions. Further, it is possible to equalize the vertical and horizontal lengths of each pixel. Accordingly, this shape is suitable as a device for magnifying an image.

Figure 23:
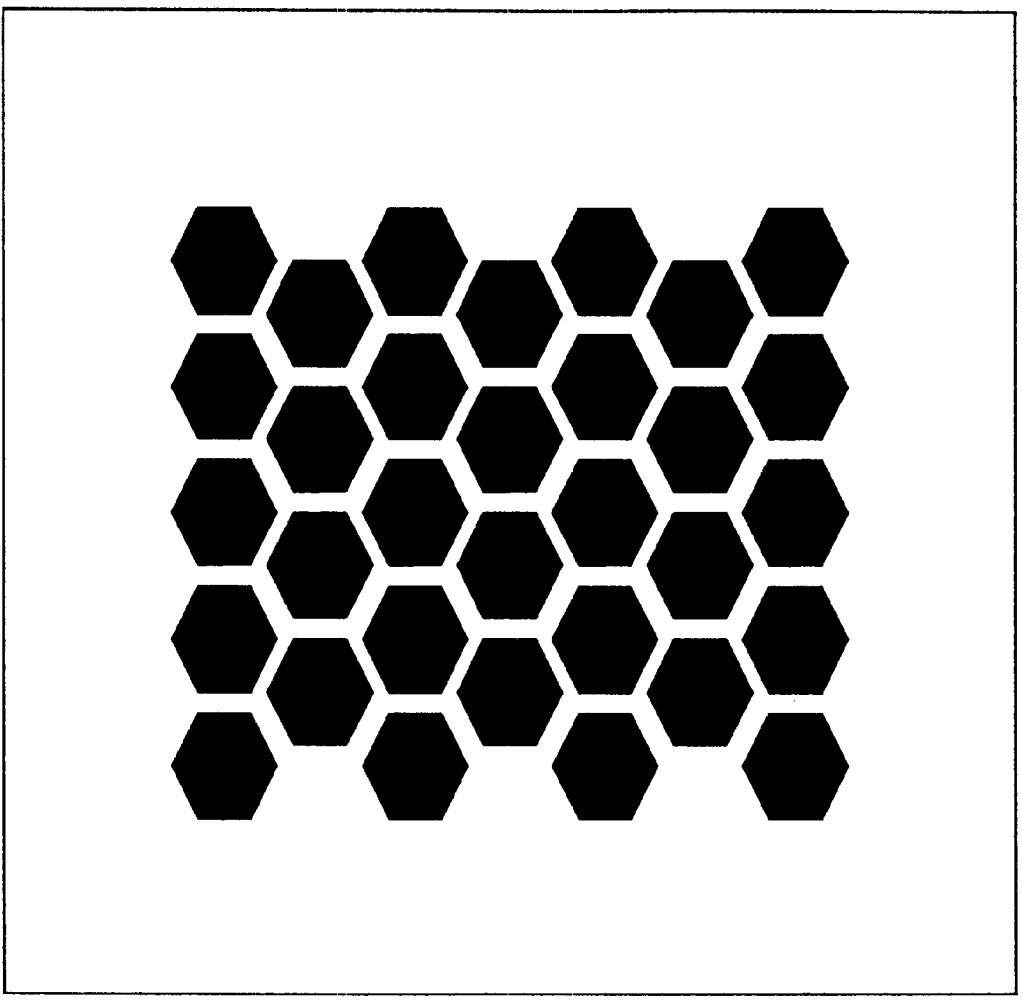
FIG. 23 illustrates a modified example of the mask shown in FIGS. 21 and 22.

Instead thereof, it is also possible to employ a hexagonal shape as a cross-sectional shape of each high-refractive-index region, as shown in FIG. 23. By thus employing the hexagonal cross section, similar to the square shape, it is possible to reduce the space of the low-refractive-index region present between the adjacent high-refractive-index regions. Furthermore, in the case of employing the hexagonal shape, in comparison to the square shape, it is possible to display a curved image in a smoother state.

In each of the above-mentioned second through eighth embodiments, i.e., each of the samples 21 through 27, the maximum angle between the center-axis direction (tangent direction of the curve passing therethrough) of the high-refractive-index region and the normal of the plate-like optical device is 50°. As can be obvious from the principle of the present invention, the above-mentioned angle increases as the position is apart further from the center axis of the optical device, as shown in FIGS. 5C and 6. For the samples 24 through 27, the thickness of the optical device is 7 mm, and the length of one side of the magnified image is 12 mm. It is preferable that the length of one side of the magnified image is larger than the thickness of the optical device for yielding a thinner optical device. Accordingly, it is preferable that the maximum angle between the center-axis direction (or the tangential direction of the curve extending from the bottom surface to the top surface of the optical device passing through the center of the cross section) of the high-refractive-index region and the normal of the plate-like optical device is not less than 45° in the periphery of the optical device.

FIGS. 21 and 22 also illustrate the photo mask used for producing a two-dimensional image magnifying/reducing optical device in a ninth embodiment of the present invention.

This optical device is manufactured by the following process:

First, 30 g of PMMA (poly-methyl-metal-acrylate), which changes in its refractive index by having ultraviolet ray applied thereto, was solved into tetrahydrofuran, then, 10 g of phthalic anhydride was mixed thereinto uniformly. From this solution, a thin plate of 5 cm×5 cm having a thickness of 100 $\mu$m was formed by a cast method. Then, by applying ultraviolet ray having a wavelength of 0.33 $\mu$m from a rear surface of the photo mask having a pattern of 200 rows×200 columns of squires as shown in FIG. 21, using a lens, an image of the mask was formed on the above-mentioned thin plate. In this case, a length of one side of each square of the above-mentioned pattern formed on the thin plate was 50 $\mu$m. Further, a separation between each adjacent squares was 10 $\mu$m. Furthermore, the center axis of the mask was aligned with the center axis of the thin plate. While the ultraviolet ray was thus applied to the thin plate through the photo mask, the temperature of the thin plate was 100° C., the intensity of the ultraviolet ray was 2 W/cm$^2$ on the thin plate, and a time for which the ultraviolet was applied thereto was 60 seconds. Photo-breaching occurs on the thin plate at which the ultraviolet ray was applied, and, as a result, the refractive index thereof decreased. When the refractive index was measured, the refractive index at a part at which no ultraviolet had been applied was 1.49 (n1) while the refractive index at a part at which the ultraviolet had been applied was 1.45 (n2).

By the same method as that described above, 49 thin plates were produced such that they are different in the length of one side of each square of the thus-imaged pattern through the above-mentioned mask and lens used, from 51 $\mu$m through 99 $\mu$m in steps of 1 $\mu$m. Further, 15 thin plates were produced each having the length of one side of each square of the thus-imaged pattern of the above-mentioned mask and lens used of 50 $\mu$m, and, 15 thin plates were produced each having the length of one side of each square of the thus-imaged pattern of the above-mentioned mask and lens used of 100 $\mu$m.

The thus-produced 79 thin plates were laminated together in a condition in which, as shown in FIG. 22, the center axes thereof are aligned together, that is, the coordinate of X1–X2 and Y1–Y2 coincides in the vertical direction. Then, the thus-obtained laminated plates were heated to 120° C. while a pressure of 2 kg/cm$^2$ was applied thereto uniformly. Thereby, fusion of the laminated plates occurred, and thus, they were bonded together. Thus, an optical device in the ninth embodiment of the present invention was obtained in which 40,000 separate high-refractive-index regions 31 are provided, and, the cross-sectional area of each high-refractive-index region on the top surface is larger than that on the bottom surface. The thus-obtained device is referred to as a sample 31.

Ten through thirteenth embodiments of the present invention will now be described.

By altering the time for which the ultraviolet ray is applied in the above-described ninth embodiment, into 25 seconds, 40 seconds, 200 seconds and 550 seconds, the refractive index n2 of the low-refractive-index region 32 (the part to which the ultraviolet ray was applied) is altered, for the tenth, eleventh, twelfth and thirteenth embodiments, respectively. The values of the refractive indexes of the low-refractive-index regions 32 for the respective embodiments are as follows:

| Embodiment No. | Ultraviolet Ray Application Time (seconds) | Refractive Index n2 |
| --- | --- | --- |
| Tenth | 25 | 1.47 |
| Eleventh | 40 | 1.46 |
| Twelfth | 200 | 1.42 |
| Thirteenth | 550 | 1.40 |

In each of the tenth through thirteenth embodiments, the refractive index n1 of each high-refractive-index region 31 is 1.49. The optical devices of these tenth through thirteenth embodiments are referred to as samples 32 through 35.

FIGS. 21 and 22 also illustrate the photo mask used for manufacturing a two-dimensional image magnifying/reducing optical device in each of a fourteenth through eighteenth embodiments of the present invention.

This optical device is manufactured by the following process:

First, 30 g of PMMA (poly-methyl-metal-acrylate), which changes in its refractive index by having ultraviolet ray applied thereto, was solved into tetrahydrofuran, then, 10 g of phthalic anhydride was mixed thereinto uniformly. From this solution, a thin plate of 5 cm×5 cm having a thickness of 100 $\mu$m was formed by a cast method. Then, ultraviolet ray was applied to the entire surface of this thin plate, while the temperature of the thin plate was 100° C., the intensity of the ultraviolet ray was 2 W/cm$^2$ on the thin plate, and a time for which the ultraviolet was applied thereto was 40 seconds. As a result, the refractive index n1 of this thin plate became 1.46. Then, by applying ultraviolet ray having a wavelength of 0.33 $\mu$m from a rear surface of the photo mask having a pattern of 200 rows×200 columns of squires as shown in FIG. 21, using a lens, an image of the mask was formed on the above-mentioned thin plate. In this case, a length of one side of each square imaged through the above-mentioned pattern and lens was 50 $\mu$m. Further, a separation between each adjacent squares was 10 $\mu$m. Furthermore, the center axis of the mask was aligned with the center axis of the thin plate. While the ultraviolet ray was thus applied to the thin plate, the temperature of the thin plate is 100° C., the intensity of the ultraviolet ray was 1 W/cm$^2$ on the thin plate, and a time for which the ultraviolet was applied thereto was altered among 20 seconds, 50 seconds, 100 seconds, 500 seconds and 2000 seconds for the fourteenth through eighteenth embodiments, respectively. Photo-breaching occurs on the thin plate at which the ultraviolet ray was applied, and, as a result, the refractive index thereof decreased. When the refractive index was measured, the refractive index n2 at a part at which the ultraviolet ray had thus been applied was as follows:

| Embodiment No. | Ultraviolet Ray Application Time (seconds) | Refractive Index n2 |
| --- | --- | --- |
| Fourteenth | 20 | 1.45 |
| Fifteenth | 50 | 1.44 |
| Sixteenth | 100 | 1.43 |
| Seventeenth | 500 | 1.40 |
| Eighteenth | 2000 | 1.37 |

In each of the fourteenth through eighteenth embodiments, the refractive index n1 of each high-refractive-index region 31 is 1.46.

By the same method as that described above, 49 thin plates were produced such that they are different in the length of one side of each square of the thus-imaged pattern through the above-mentioned mask and lens used, from 51 $\mu$m through 99 $\mu$m in steps of 1 $\mu$m. Further, 15 thin plates were produced each having the length of one side of each square of the thus-imaged pattern of the above-mentioned mask and lens used of 50 $\mu$m, and, 15 thin plates were produced each having the length of one side of each square of the thus-imaged pattern of the above-mentioned mask and lens used of 100 $\mu$m.

The thus-produced 79 thin plates were laminated together in a condition in which, as shown in FIG. 22, the center axes thereof are aligned together, that is, the coordinate of X1–X2 and Y1–Y2 coincides in the vertical direction. Then, the thus-obtained laminated plates were heated to 120° C. while a pressure of 2 kg/cm$^2$ was applied thereto uniformly. Thereby, fusion of the laminated plates occurred, and thus, they were bonded together. Thus, an optical device in the each of the fourteenth through eighteenth embodiments of the present invention was obtained in which 40,000 separate high-refractive-index regions 31 are provided, and, the cross-sectional area of each high-refractive-index region on the top surface is larger than that on the bottom surface. The thus-obtained devices are referred to as samples 36 through 40.

A nineteenth embodiment of the present invention will now be described. In this case, embossment is performed on the bottom surface of the above-mentioned sample 31 in the ninth embodiment such that, for each pixel (high-refractive-index region 31), the end surface is rendered convex, as shown in FIG. 11. In this case, the radius of curvature of the convex shape is 50 $\mu$m. The thus-obtained device is referred to as a sample 41.

A twentieth embodiment of the present invention will now be described. In this case, embossment is performed on the top surface of the above-mentioned sample 41 of the nineteenth embodiment such that, for each pixel, the end surface is rendered concave, as shown in FIG. 12A. In this case, the radius of curvature of the concave shape is 100 $\mu$m. The thus-obtained device is referred to as a sample 42.

A twenty-first embodiment of the present invention will now be described. In this case, embossment is performed on the top surface of the above-mentioned sample 41 of the nineteenth embodiment such that, for each pixel, the end surface is rendered convex, as shown in FIG. 12B. In this case, the radius of curvature of the convex shape is 100 $\mu$m. The thus-obtained device is referred to as a sample 43.

For the above-mentioned samples 31 through 43, evaluation was made for ① brightness of a magnified image and ② angle of visibility. The result of the evaluation is shown below:

| Sample No. | ① Brightness | ② Angle of Visibility |
|---|---|---|
| 31 | Δ | Δ |
| 32 | × | × |
| 33 | Δ | Δ |
| 34 | Δ | Δ |
| 35 | ○ | ○ |
| 36 | × | × |
| 37 | × | × |
| 38 | Δ | Δ |
| 39 | Δ | Δ |
| 40 | ○ | ○ |
| 41 | ○ | Δ |
| 42 | ○ | ○ |
| 43 | ○ | ○ | where the original image to be magnified, an image obtained from projection of an ITE test chart produced on a transparent film by a color viewer was used. Further, ○, Δ, × of the above table denote the following criteria:

① Brightness:

○: (brightness of original image($cd/cm^2$))/(brightness of magnified image($cd/cm^2$))·(magnification (area ratio))<2.0;

Δ: 2.0≦(brightness of original image ($cd/cm^2$))/ (brightness of magnified image ($cd/cm^2$))·(magnification (area ratio))<3.0; and ×: 3.0≦(brightness of original image ($cd/cm^2$))/ (brightness of magnified image ($cd/cm^2$))·(magnification (area ratio)).

② Angle of visibility:

○: not less than 60°;

Δ: not less than 30° but less than 60°; and

×; less than 30°.

Figure 24:
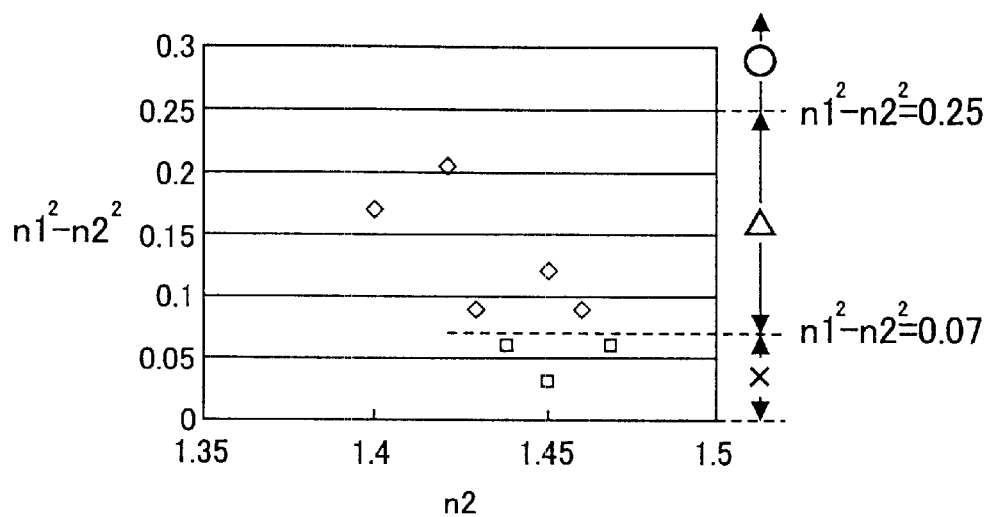
FIG. 24 illustrates an evaluation result for samples 31 through 40.

FIG. 24 shows a graph in which the horizontal axis represents the refractive index n2, and the vertical axis represents $n1^2-n2^2$ for the above-mentioned samples 31 through 40, where n1 denotes the refractive index of the high-refractive-index regions 31 while n2 denotes the refractive index of the low-refractive-index region 32.

According to the result of the above evaluation of the experiments performed for the samples 31 through 40, it can be seen, that, without regard to the absolute values of n1 and n2, the evaluation results is × for each of both the brightness and angle of visibility when the following requirement is satisfied:

$$n1^2-n2^2<0.07$$

the evaluation results is Δ for each of both the brightness and angle of visibility when the following requirements are satisfied:

$$n1^2-n2^2≧0.07, \text{ and, also, } n1^2-n2^2<0.25$$

the evaluation results is ○ for each of both the brightness and angle of visibility when the following requirement is satisfied:

$$n1^2-n2^2≧0.25$$

With regard to the sample 41, as the shape of the entrance end surface (reduction surface 48) of the high-refractive-index region 31 is rendered convex 31a, the light amount incident on the high-refractive-index region 31 increases, and, thus, the brightness is improved in comparison to the sample 31.

With regard to the samples 42 or 43, as the shape of the exit end surface (on the magnification surface 51) of the high-refractive-index region 31 is rendered convex 31c or concave 31b, the angle by which image light is dispersed/spread is increased. Thereby, in comparison to the sample 41, the angle of visibility is improved.

In each of the above-described embodiments of the present invention, the image magnifying/reducing optical device has a plate-like shape and the high-refractive-index region 31 extends continuously from the bottom surface 48 to the top surface 51. However, the present invention is not limited thereto, and, the high-refractive-index region may extend from a side surface to a top surface, and the optical device may have a spherical surface, for example. Thus, shapes of surfaces of the optical device are not limited thereto, and, also, positions in which the high-refractive-index region (fiber) extends are not limited thereto.

Furthermore, by disposing a two-dimensional solid image pickup device (136, shown in FIG. 10) such as a two-dimensional CCD or the like so as to face the reduction surface 48 of the image magnifying/reducing optical device 1, it is possible to yield an image reduction reading device which reduces an image and reads it.

Another method of manufacturing the optical device according to the present invention including one shown in FIG. 9A or 9B will now be described.

Figure 25:
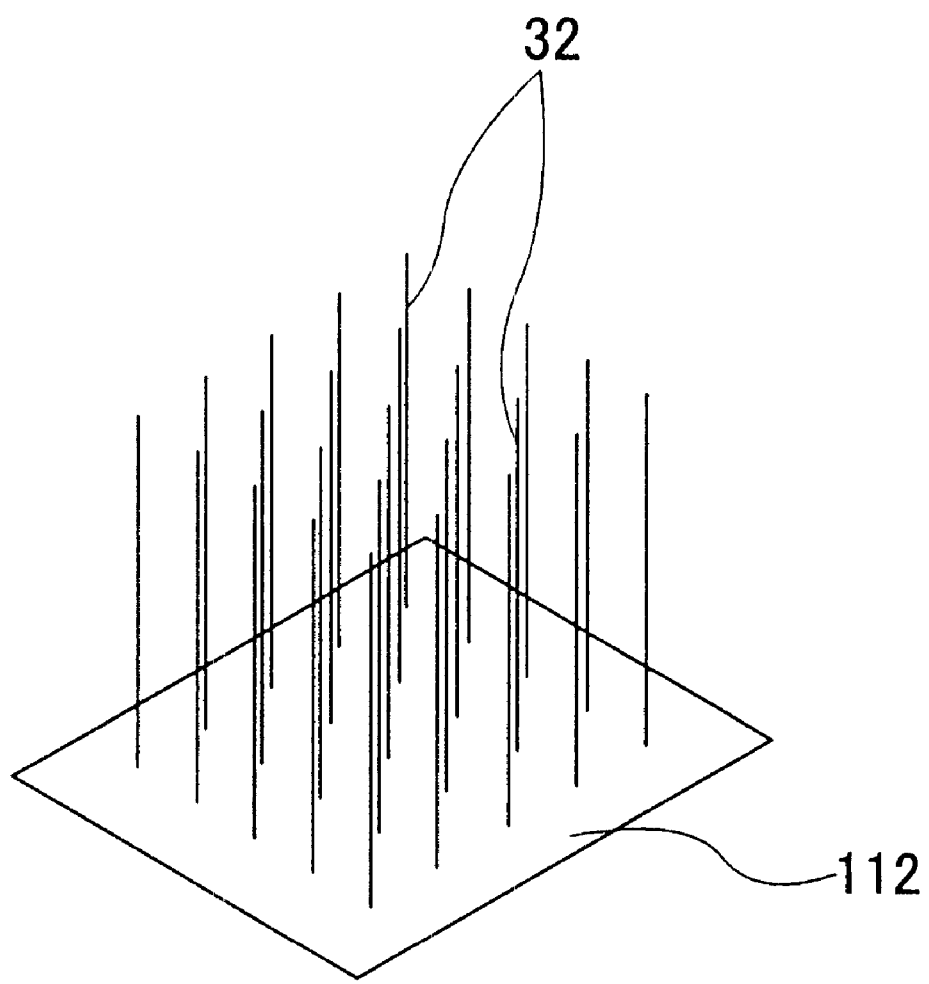
FIGS. 25 illustrates an intermediate process (perspective view) of a manufacturing method for an image magnifying/reducing optical device in each of twenty-second through thirty-second embodiments of the present invention.
Figure 26A:
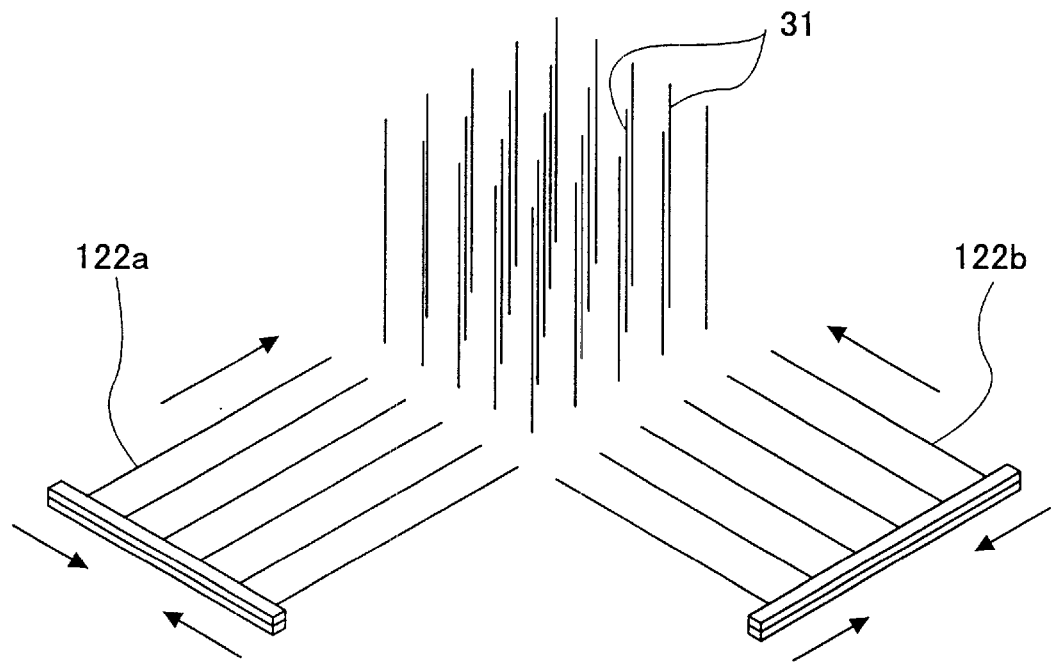
FIGS. 26A and 26B illustrate a process (perspective view) for controlling intervals of fibers in the manufacturing method for the image magnifying/reducing optical device in each of twenty-second through thirty-second embodiments of the present invention.
Figure 26B:
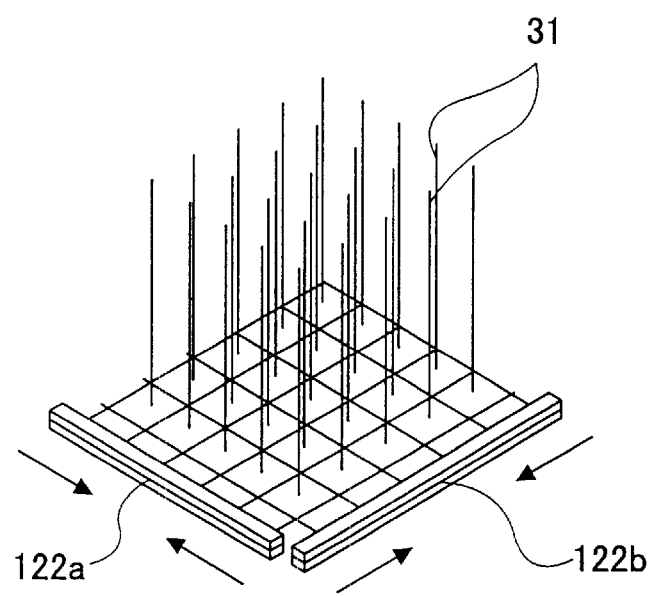
Figure 27A:
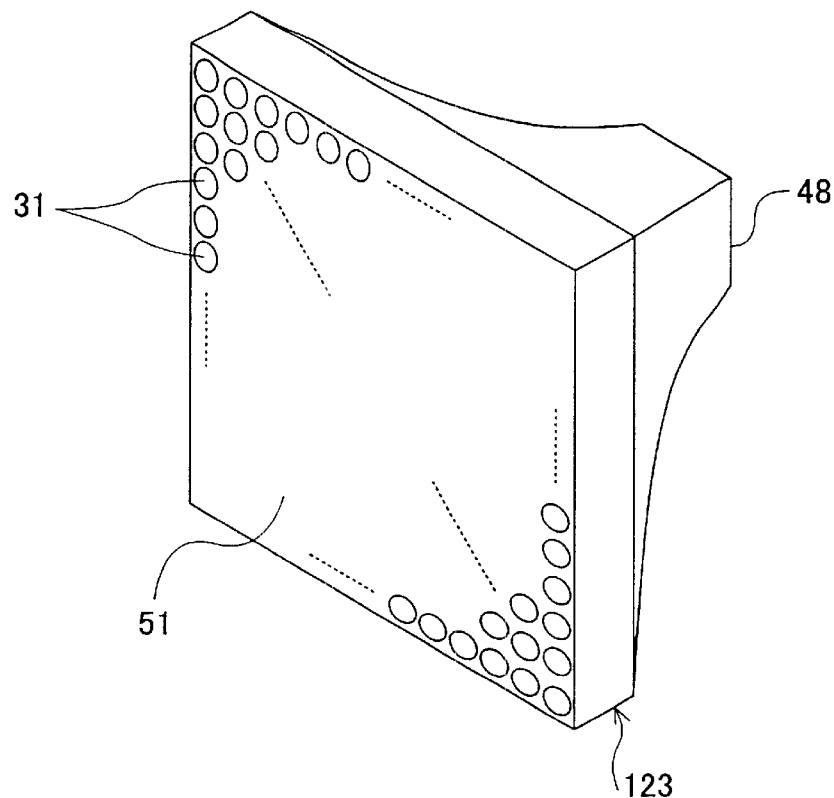
FIGS. 27A and 27B illustrate a fiber bundle (FIG. 27A shows a perspective view while FIG. 27B shows a side-elevational sectional view) of the image magnifying/reducing optical device in each of twenty-second through thirty-second embodiments of the present invention.
Figure 27B:
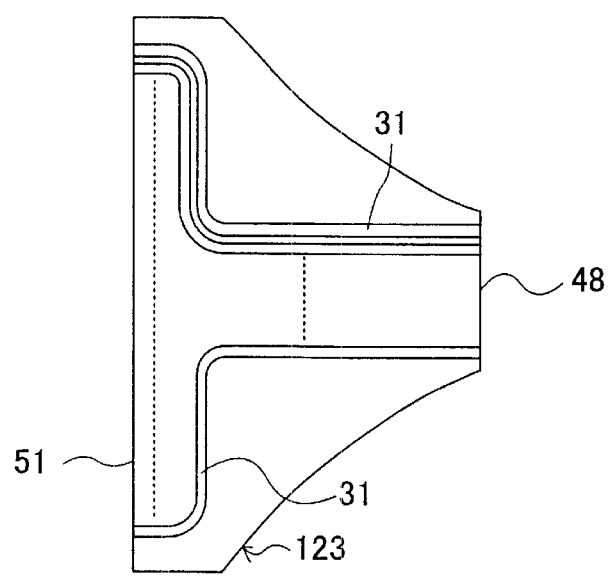

In a first step, as shown in FIG. 25, a plurality of high-refractive-index fibers 31 are caused to pass through a fiber-interval fixing member 112. Then, the other ends of the high-refractive-index fibers 31 are caused to pass through members 122a and 122b which have a mesh structure in which the intervals of the elements thereof can be freely changed, as shown in FIG. 26A. Then, as shown in FIG. 26B, by changing the intervals of the elements of the members 122a and 122b, the intervals of the fibers 31 in the end are changed. Thereby, as shown in FIGS. 27A and 27B, a fiber bundle 123 having different fiber intervals between both ends thereof are yielded.

Figure 28:
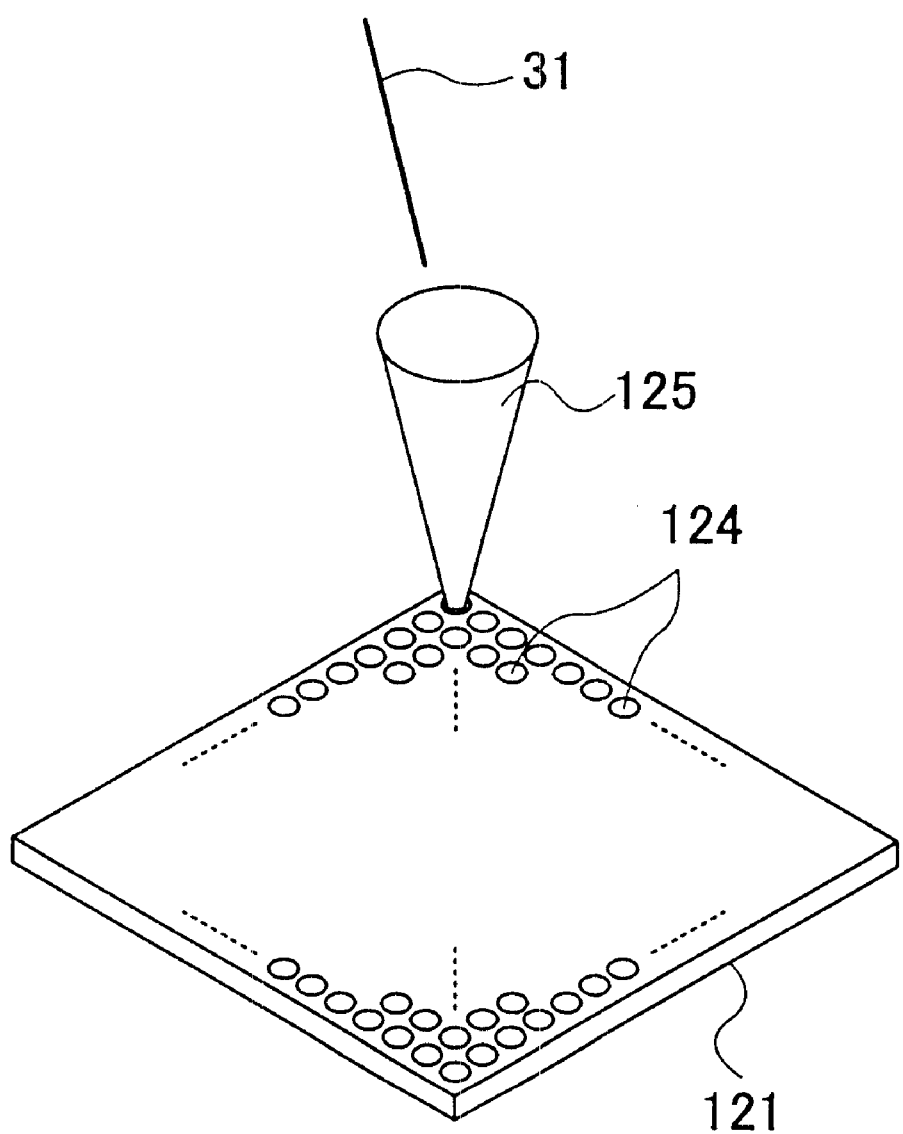
FIG. 28 illustrates a process (perspective view) of inserting the fiber into an interval fixing member in the manufacturing method for the image magnifying/reducing optical device in each of twenty-second through thirty-second embodiments of the present invention.

Further, when the high-refractive-index fibers 31 are caused to pass through holes 124 of the fiber interval fixing member 112, a funnel-shaped (conic) guiding member 125 may be used, as shown in FIG. 28. Thereby, it is possible to insert many high-refractive-index fibers 31 into the holes 124 of the fiber interval fixing member 112 easily at high efficiency.

Furthermore, by previously coating photo-curing or heat-curing adhesive on the high-refractive-index fibers 31, it is possible to easily bundle the fibers 31 as they can easily slide on each other. Further, it is easy to fix the fibers 31 into a bundle by applying light or heat thereto. Thus, manufacturing efficiency can be remarkably improved.

In a second step, the end of the fiber bundle 123 on the side of the magnification surface 51 is immersed into a photo-curing resin mixed solution. Then, ultraviolet ray is applied from the side of the reduction surface 48 of the fiber bundle 123. Thereby, as shown in FIG. 9A, it is possible to yield the many high-refractive-index fibers 31 each having an expanding tapered shape on the side of the magnification surface 51 thereof simultaneously.

Figure 29:
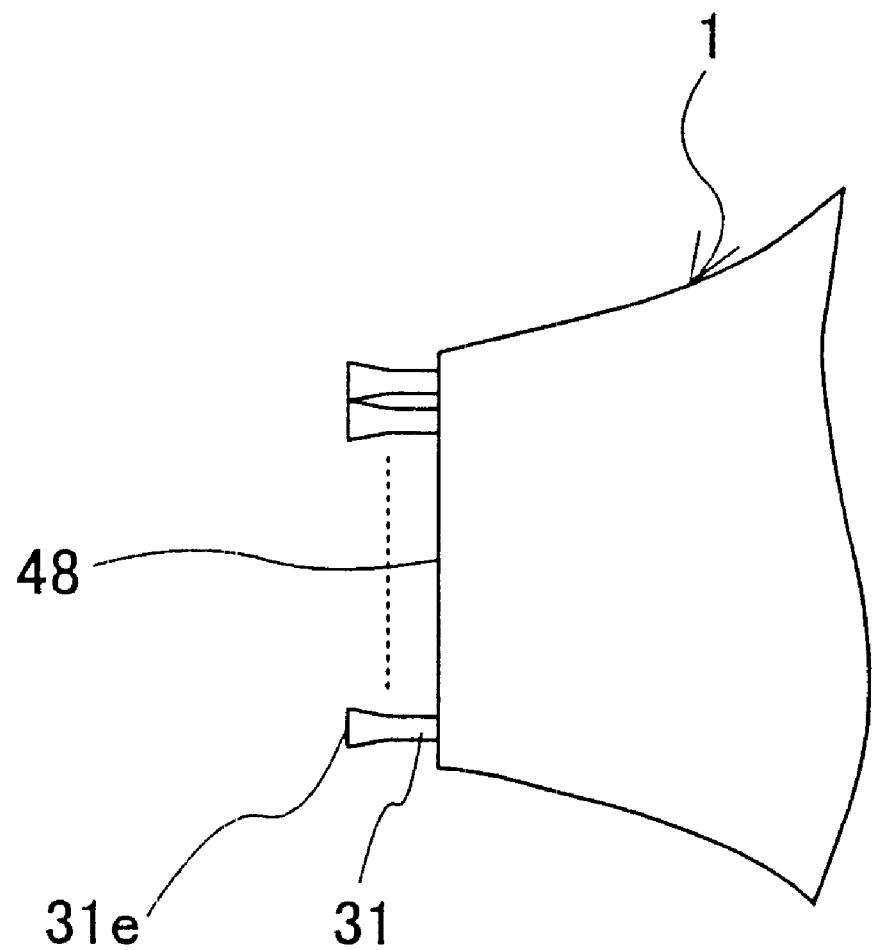
FIG. 29 illustrates a process (side elevational view) of forming expanding tapered parts in a manufacturing method for the image magnifying/reducing optical device having the structure shown in FIG. 9B.

Then, the end of the fiber bundle 123 on the side of the reduction surface 48 is immersed into a photo-curing resin mixed solution. Then, ultraviolet ray is applied from the side of the magnification surface 51 thereof. Thereby, as shown in FIG. 29, it is possible to yield the many high-refractive-index fibers 31 each also having an expanding tapered shape 31e on the side of the reduction surface 48 thereof. Thereby, the fiber bundle 123 in which the many high-refractiveindex fibers 31 each having expanding tapered shapes on both end of the reduction surface 48 and end of the magnification surface 51 thereof are bundled can be yielded.

Figure 16:
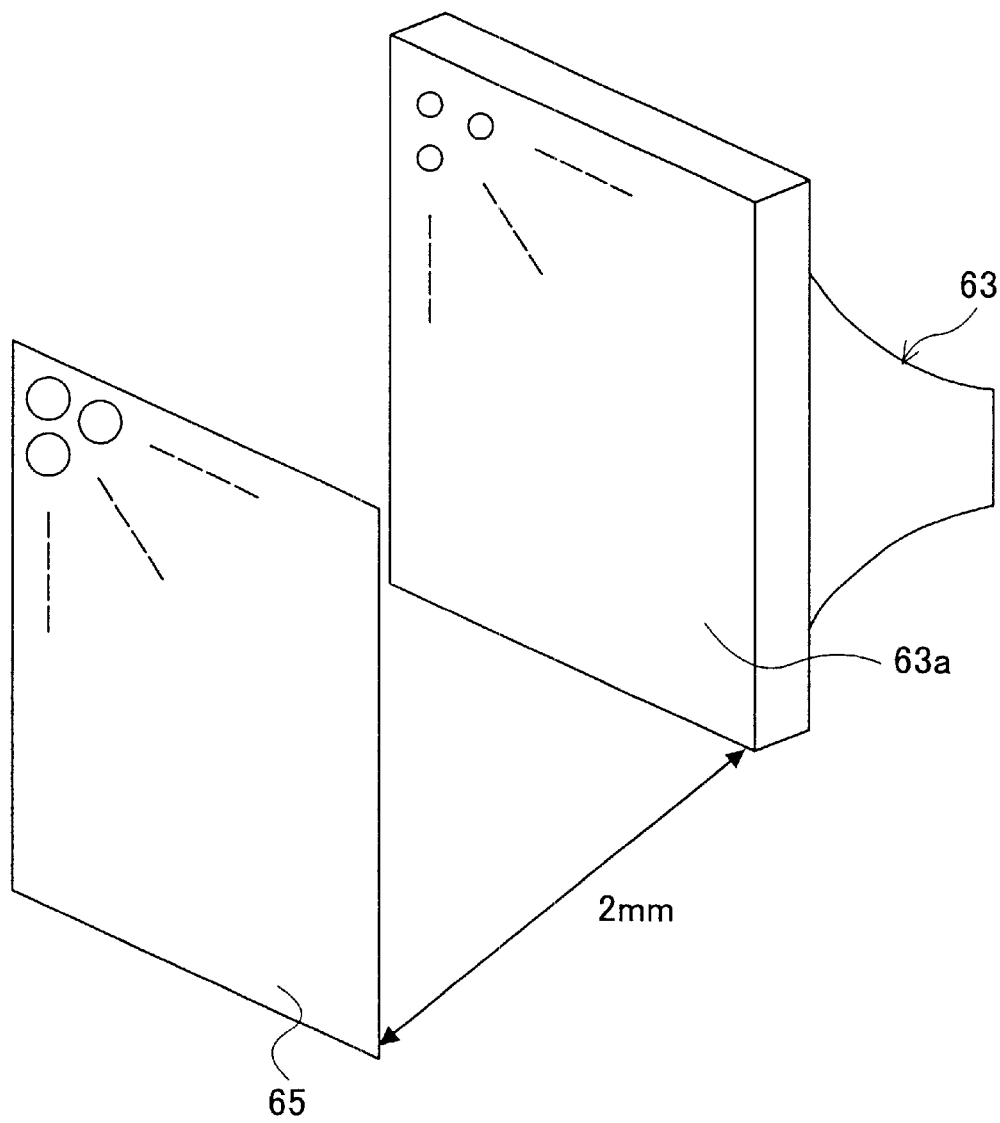
FIGS. 16 and 17 illustrate a modified manufacturing process for an image magnifying/reducing optical device according to the present invention.
Figure 30:
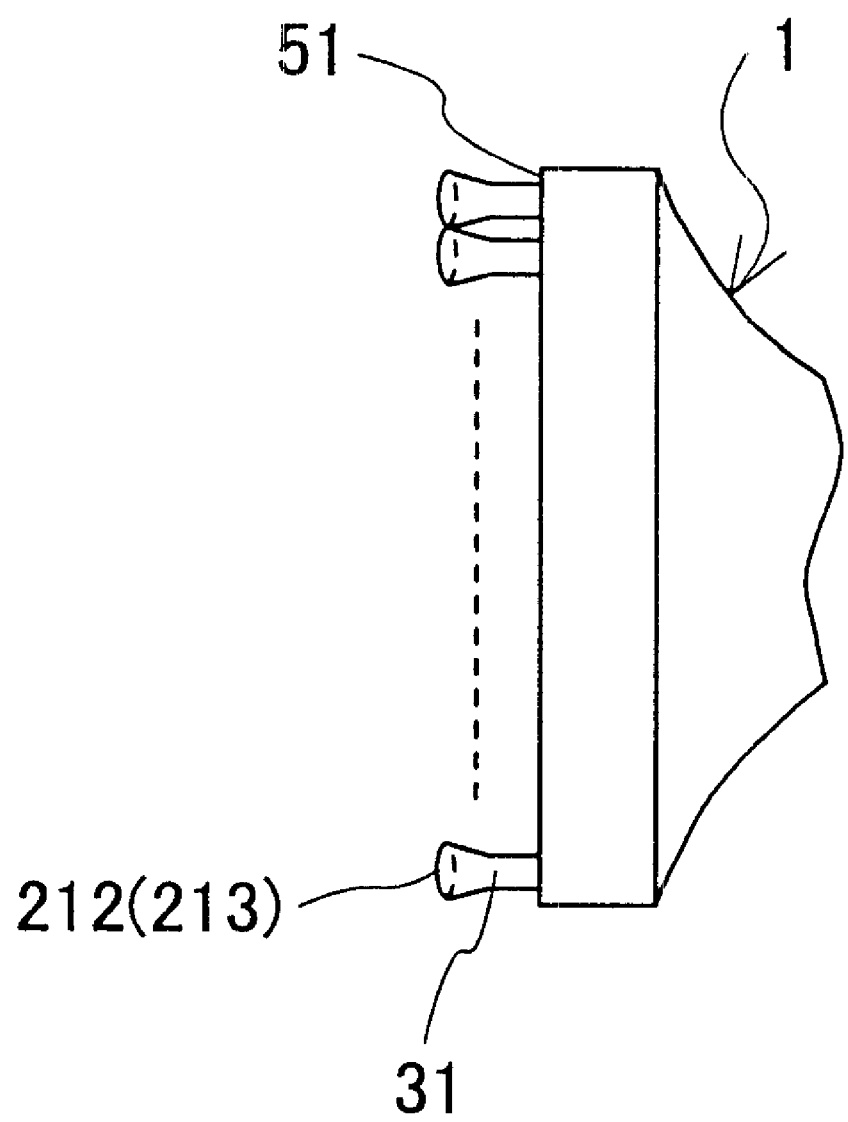
FIG. 30 illustrates a process (side elevational view) of forming expanding tapered parts with convex/concave end surfaces in the manufacturing method according to the present invention.

Further, similarly, by applying light through the high-refractive-index fibers 31 toward concave/convex substrate, in the photo-curing solution, such as that shown in FIG. 16, it is possible to automatically form the convex/concave surface shape (212/213) of the end of each high-refractive-index fiber 31, as shown in FIG. 30.

The above-mentioned photo-curing resin used in the manufacturing method may be acrylic one, methacrylate one or the like. Further, the above-mentioned high-refractive-index fibers may be quartz fibers or the like. However, it may be high-polymer fibers, and is not limited thereto.

Other embodiments of the present invention will now be described with experiments as follows so as to prove advantages of the present invention.

A twenty-second embodiment of the present invention will now be described.

In a step 1, one ends of quartz multi-mode fibers (core/clad=70/90 $\mu$m) on which epoxy heat-curing adhesive was previously coated were caused to pass the fiber interval fixing member 121 having 1000×1000 holes 24 with the intervals of 300 $\mu$m, by using the conic guiding member 125, as shown in FIG. 28, and were then fixed. Then, as shown in FIGS. 26A and 26B, the other ends of the fibers were caused to pass through the mesh structure members 122$a$ and 122$b$ having variable intervals of the elements thereof. Then, the intervals between the fibers were shortened so as to be 150 $\mu$m in accordance with the above-mentioned formula (1). Then, by heating this state of the fibers so as to fixing the fibers together, a fiber bundle 123 shown in FIGS. 27A and 27B was yielded. Then, the end surface of the fiber bundle 123 was caused to undergo optical polishing. In this configuration, the surface on which the fibers were bundled with the intervals of 150 $\mu$m was the reduction surface 48 while the surface on which the fibers were bundled with the intervals of 300 $\mu$m was the magnification surface 51.

In a step 2, the magnification surface of the thus-yielded fiber bundle 123 was immersed into acrylate photo-curing resin mixed solution made by Three-Bond Co., Ltd., and, light from an extra-high pressure mercury lamp was applied from the reduction surface 48. Thereby, by photopolymerization reaction, curing reaction occurred, and, then, 2-millimeter-length expanding-tapered fibers such as those shown in FIG. 9A were formed automatically. In this time, the light source used was a ultraviolet-ray applying device EX-250 made by HOYA-SCHOTT Co., Ltd. After the expanding-tapered high-refractive-index fibers 31 were thus produced, the non-cured resin part was removed by acetone. Then, a clad layer was formed on each fiber 31 by heat curing of epoxy fluoride which had a refractive index lower than the above-mentioned photo-curing resin.

In a step 3, in order to fix the expanding tapered parts (light waveguides) 31$d$ formed on the magnification surface 51, epoxy fluoride resin which has a refractive index lower than the above-mentioned photo-curing resin was coated onto the expanding tapered parts 31$d$, and was caused to be cured. After that, the magnification surface 51 of the tapered light waveguides 31$d$ was caused to undergo optical polishing. At this time, the thus-optical-polished tapered light waveguides 31$d$ had a diameter of 290 $\mu$m each.

In a step 4, the reduction surface 48 of the thus-yielded fiber bundle 123 was immersed into acrylate photo-curing resin mixed solution made by Three-Bond Co., Ltd., and, light from an extra-high pressure mercury lamp was applied from the magnification surface 51. Thereby, by photopolymerization reaction, curing reaction occurred, and, then, extending-end expanding-tapered parts (light waveguides) 31$e$ such as those shown in FIG. 29 were formed automatically on the extending ends of the fibers 31. In this time, the light source used was a ultraviolet-ray applying device EX-250 made by HOYA-SCHOTT Co., Ltd. After the expanding-tapered light waveguides 31$e$ were thus formed, the reduction surface 48 of the fiber bundle 123 was lifted from the photo-curing resin, and the non-cured resin part was removed/cleaned by acetone.

In a step 5, in order to fix the expanding tapered parts (light waveguides) 31$e$ formed on the reduction surface 48, epoxy fluoride resin which has a refractive index lower than the above-mentioned photo-curing resin was coated onto the expanding tapered parts 31$e$, and was caused to be cured. After that, the reduction surface 48 of the tapered light waveguides 31$e$ was caused to undergo optical polishing. At this time, the thus-optical-polished tapered light waveguides 31$e$ had a diameter of 145 $\mu$m each.

Through the above-mentioned steps 1 through 5, a thin image magnifying/reducing optical device 1 such as that shown in FIG. 9B was yielded. This sample is referred to as a sample 51.

A twenty-third embodiment of the present invention will now be described. In this embodiment, a micro-lens array 50 shown in FIG. 10 having intervals of 150 $\mu$m corresponding to those of the core intervals was disposed so as to face the reduction surface 48 of the above-mentioned sample 51. The thus-yielded sample is a sample 52.

A twenty-fourth embodiment of the present invention will now be described.

In the above-mentioned twenty-second embodiment, the side surfaces of the high-refractive-index fibers 31 were coated to be black, also, after the clad layer was formed on each tapered light waveguide 31$d$, and after the clad layer was formed on each tapered light waveguide 31$e$, the reduction surface 48 and magnification surface 51 were masked, then, the entire device was immersed into black paint. After the paint was dried, the masks were removed. Thereby, a thin image magnifying/reducing optical device 1 in which only the side surface of each fiber had the light absorbing layer coated thereon was yielded. This sample is a sample 53.

A twenty-fifth embodiment of the present invention will now be described.

In the above-mentioned twenty-second embodiment, gold was vapor-deposited onto the side surfaces of the high-refractive-index fibers 31, also, after the clad layer was formed on each tapered light waveguide 31$d$, and after the clad layer was formed on each tapered light waveguide 31$e$, the reduction surface 48 and magnification surface 51 were masked, then, the entire device was placed into a gold vapor-depositing device, and, thus, gold was vapor-deposited thereon with a film thickness of 500 Å. After the vapor deposition, the masks were removed. Thereby, a thin image magnifying/reducing optical device 1 in which only the side surface of each high-refractive-index fiber 31 had the gold deposited thereon was yielded. This sample is a sample 54.

A twenty-sixth embodiment of the present invention will now be described.

Figure 31:
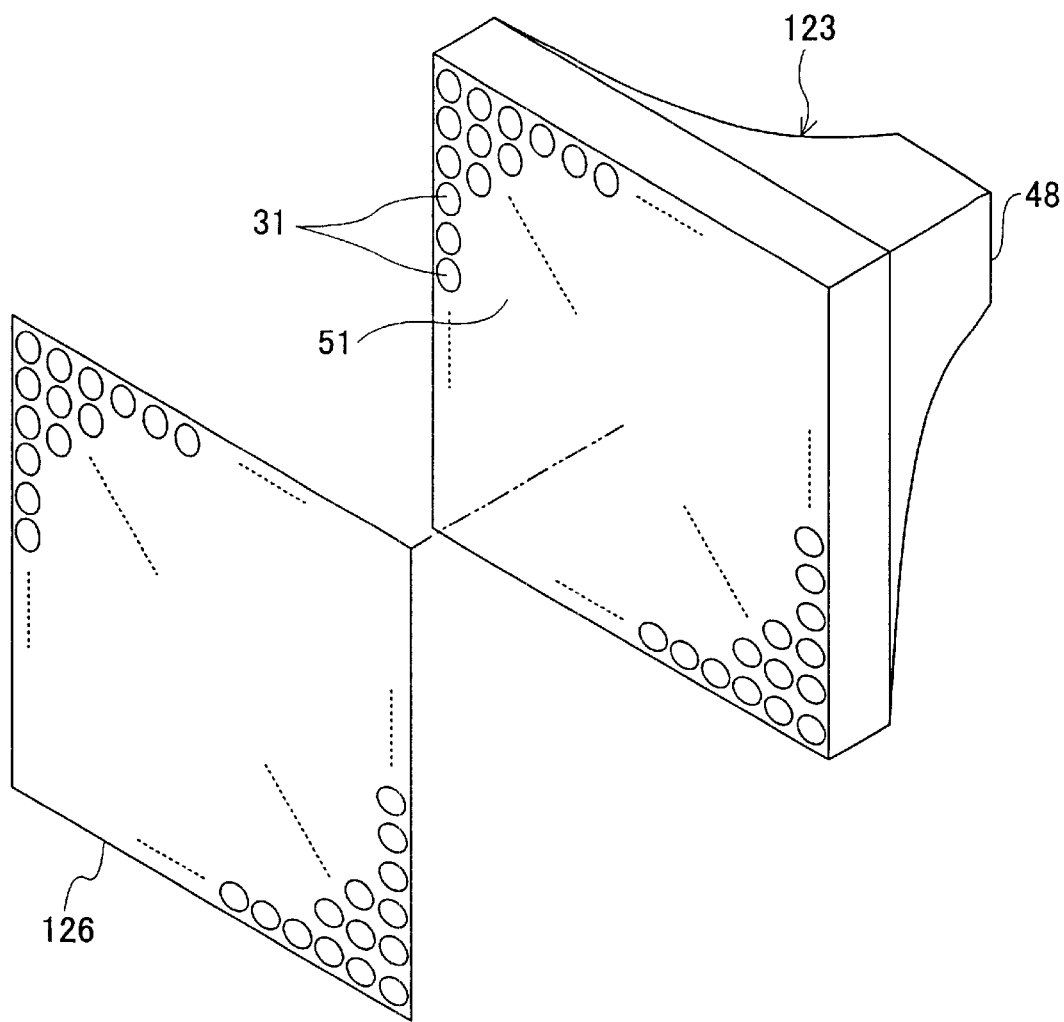
FIG. 31 illustrates the process (perspective view) of forming the expanding tapered parts with the convex/concave end surfaces in the manufacturing method according to the present invention.

In the step 2 of the above-mentioned twenty-second embodiment, a transparent concave substrate 126 such as that shown in FIG. 31 was disposed apart from the exiting surface of the ultraviolet ray of the fiber bundle 123 by 2 millimeters with alignment with the light exiting directional position of each high-refractive-index fiber 31, as shown in FIG. 31. In this condition, the ultraviolet ray was applied and thus, the expanding tapered parts were formed, and were fixed by low-refractive-index epoxy fluoride resin. Then, after removing the transparent concave substrate 126, the tapered fibers each having a convex exiting end surface, as shown in FIG. 12B, were yielded. This sample is a sample 55.

A twenty-seventh embodiment of the present invention will now be described.

In the above-mentioned twenty-sixth embodiment, instead of the transparent concave substrate 126, a transparent convex substrate was used. Thereby, the tapered fibers each having a concave exiting end surface, as shown in FIG. 12A, were yielded. This sample is a sample 56.

A twenty-eighth embodiment of the present invention will now be described.

In the above-mentioned twenty-second embodiment, the fibers 31 were fixed in the vicinity of the reduction surface 48 and in the vicinity of the magnification surface 51 in a manner such that the fiber center axis direction was inclined from the normal of the reduction/magnification surface 48/51 by not less than 45° at the maximum there. The thus-produced sample is a sample 57.

A twenty-ninth embodiment of the present invention will now be described.

In the above-mentioned twenty-second embodiment, the length ln of the high-refractive-index fiber 31 at any position satisfies the above-mentioned formula (2). The thus-produced sample is a sample 58.

A thirtieth embodiment of the present invention will now be described.

In the above-mentioned twenty-second embodiment, the length ln of the high-refractive-index fiber 31 at any position satisfies the above-mentioned formula (3). The thus-produced sample is a sample 59.

A thirty-first embodiment of the present invention will now be described.

In a method similar to the method of the above-mentioned twenty-second embodiment, 3200×3200 quartz multi-mode fibers each having a diameter of 20 μm were used, and an optical device was yielded in which the diameter of each fiber 31 on the reduction surface 48 is 60 μm, while the diameter of each fiber 31 on the magnification surface 51 is 120 μm. This sample is a sample 60.

A thirty-second embodiment of the present invention will now be described.

An optical device was produced by the same method as that of the above-mentioned thirty-first embodiment except that the diameter of each of the quartz multi-mode fibers used was 21 μm. This sample is a sample 61.

For the above-mentioned samples 51 through 59, evaluation was made for ① brightness of a magnified image, ② uniformity of brightness of the magnified image, ③ contrast, and ④ angle of visibility. The result of the evaluation is shown below:

| Sample No. | ① Brightness | ② Uniformity in Brightness | ③ Contrast | ④ Angle of Visibility |
|---|---|---|---|---|
| 51 | Δ | Δ | Δ | Δ |
| 52 | ○ | Δ | Δ | Δ |
| 53 | Δ | Δ | ○ | Δ |
| 54 | Δ | Δ | ○ | Δ |
| 55 | Δ | Δ | Δ | ○ |

-continued

| Sample No. | ① Brightness | ② Uniformity in Brightness | ③ Contrast | ④ Angle of Visibility |
|---|---|---|---|---|
| 56 | Δ | Δ | Δ | ○ |
| 57 | × | × | Δ | Δ |
| 58 | × | × | × | × |
| 59 | Δ | × | × | × |

○, Δ, × of the above table denote the following criteria:
① Brightness:
○: (brightness of original image($cd/cm^2$))/(brightness of magnified image($cd/cm^2$))·(magnification (area ratio))<20;
Δ: $2.0 \leq$ (brightness of original image($cd/cm^2$))/(brightness of magnified image($cd/cm^2$))·(magnification (area ratio))<3.0; and
×: $3.0 \leq$ (brightness of original image($cd/cm^2$))/(brightness of magnified image($cd/cm^2$))·(magnification (area ratio)).
② Uniformity in brightness:
○: variation in brightness of magnified image($cd/cm^2$) is smaller than ±10%;
Δ: variation in brightness of magnified image($cd/cm^2$) is not smaller than ±10% but smaller than ±30%; and
X: variation in brightness of magnified image($cd/cm^2$) is not smaller than ±30.
③ Contrast:
○: not less than 20;
Δ: not more than 5 but less than 20; and
×: less than 5.
④ Angle of visibility:
○: not less than 90°;
Δ: not less than 30° but less than 90°; and
×; less than 30°.

The original image to be magnified used was an image obtained through projection of an ITE test chart produced on a transparent film by a color viewer With regard to the sample 51, light from the original image is somewhat lost by the low-refractive-index region. In contrast thereto, with regard to the sample 52, the light lost in the sample 51 is directed to the high-refractive-index region by the micro-lens array 50. Thereby, the brightness is improved, and, also, the contrast is improved in the sample 52.

With regard to the sample 53 or 54, as the light absorbing layer or gold film is provided on the side wall of each fiber. Accordingly, no stray light from adjacent fibers occurs, and, as a result, the contrast is improved.

With regard to each of the samples 55 and 56, as the shape of the exit end surface of the high-refractive-index region is rendered convex or concave, the angle by which image light is dispersed is increased. Thereby, in comparison to the sample 51, the angle of visibility is improved.

With regard to the sample 57, as the fiber center-axis line is inclined from the normal of each of the magnification surface and reduction surface in vicinity thereof by not less than 45° maximum, the efficiency in light incidence/entrance from the bottom surface is degraded, and, also, as the center-axis direction of the light exiting from the top surface is greatly inclined from the normal thereof, the brightness, uniformity of brightness were degraded.

With regard to the sample 58, as the fiber length is increased, the device surface is rendered uneven, and, also, as the light path is rendered longer unnecessarily, the brightness was degraded.

With regard to the sample 59, as the fibers are too short, the device surface is rendered uneven, the angle of visibility and uniformity in brightness were degraded.

As the lengths of the fibers are determined according to the above-mentioned formula (1) in the sample 51, the device surface is rendered smooth, and, the above-mentioned evaluation items were improved in comparison to the samples 58 and 59. Thus, it is preferable to conform to the formula (1).

With regard to the above-mentioned samples 60 and 61, the sample 60 has the thickness thereof, other than the tapered parts, of not more than 4 cm, while the sample 61 has the same thickness not less than 4 cm. Accordingly, the sample 60 is superior than the sample 61 for the device thickness.

In fact, the sample 60 satisfies the above-mentioned formula (4) while the sample 61 does not satisfy it. Accordingly, it is important for this formula to be satisfied in order to reduce the thickness of the optical device.

The present invention is not limited to the above-described embodiments, and variations and modifications may be made without departing from the scope of the present invention.

The present application is based on Japanese priority applications Nos. 2000-198027, 2000-198028, 2000-233986 and 2000-355299, filed on Jun. 30, 2000, Jun. 30, 2000, Aug. 2, 2000 and Nov. 22, 2000, respectively, the entire contents of which are hereby incorporated by reference.

What is claimed is:

1. An image magnifying/reducing optical device comprising:
    a base member having first and second surfaces which are approximately parallel to one another; and
    a plurality of high-refractive-index regions formed in said base member,
    said plurality of high-refractive-index regions continuously extending from the first surface to the second surface of said base member; and
    a sectional area of each of said plurality of high-refractive-index regions around said second surface being larger than that around said first surface.

2. The optical device as claimed in claim 1, wherein:
    each of said plurality of high-refractive-index regions extends approximately perpendicular to at least one of the first surface in the vicinity thereof and the second surface in the vicinity thereof.

3. The optical device as claimed in claim 1, wherein a diameter of each of said plurality of high-refractive-index regions is approximately fixed in a position in which a center-axis line thereof is inclined from a normal of the second surface by not less than 45°.

4. The optical device as claimed in claim 1, wherein a cross-sectional area of each high-refractive-index region is increased gradually in the vicinity of the second surface, and has a tapered shape.

5. The optical device as claimed in claim 1, wherein a cross-sectional area of each high-refractive-index region is increased after being decreased from that on the first surface.

6. The optical device as claimed in claim 1, wherein a micro lens is disposed for one of the first and second surfaces, said one of the first and second surfaces being a surface on which light is incident for changing a size of an image.

7. The optical device as claimed in claim 1, wherein one of a light absorbing layer and a metal film is provided on a side surface of each high-refractive-index region.

8. The optical device as claimed in claim 1, wherein each high-refractive-index region has one of a convex surface and a concave surface on at least one end surface thereof.

9. The optical device as claimed in claim 1, wherein at least a part of each high-refractive-index region is joined by a mesh-like high-polymer member having a shrinkable property in at least a part thereof.

10. The optical device as claimed in claim 1, wherein at least a part of each high-refractive-index region is joined by a member which can enter a gel-like state in at least at a part thereof.

11. The optical device as claimed in claim 1, wherein a relative relationship between said plurality of high-refractive-index regions on the first surface is also maintained on the second surface.

12. The optical device as claimed in claim 1, wherein a ratio of a cross-sectional area of each high-refractive-index region on the first surface to a cross-sectional area thereof on the second surface is approximately uniform throughout said plurality of high-refractive-index region.

13. The optical device as claimed in claim 1, wherein said plurality of high-refractive-index regions comprise at least a part at which a center-axis direction of the high-refractive-index region is inclined from a normal of the base member by not less than 45°.

14. The optical device as claimed in claim 1, wherein an angle between light transmitted by the high-refractive-index region when it is incident on said first surface and a normal of said base member is not more than 30° in the vicinity of said first surface.

15. The optical device as claimed in claim 1, wherein an angle between light transmitted by the high-refractive-index region when it exists from said second surface and a normal of said base member is not more than 30° in the vicinity of said second surface.

16. The optical device as claimed in claim 1, wherein a cross-sectional shape of each high-refractive-index region is approximately squire on the second surface.

17. The optical device as claimed in claim 1, wherein a cross-sectional shape of each high-refractive-index region is approximately hexagon on the second surface.

18. The optical device as claimed in claim 1, said plurality of high-refractive-index regions comprise high-polymer fibers.

19. The optical device as claimed in claim 18, wherein the high-polymer fiber at any position has a length lx satisfying the following formula (1):

$$t(n+1)\left(\sqrt{\frac{\sum_{a=1}^{N} Sa}{\sum_{a=1}^{N} sa}} - 1\right) + l_{min} \geq lx \geq \frac{l_{min}}{\sin\theta} \quad (1)$$

where:
    N denotes the total number of the fibers;
    a denotes the sequential number of each fiber;
    Sa denotes the area of the end surface of the fiber a on the second surface;
    sa denotes the area of the end surface of the fiber a on the first surface;
    $l_{min}$ denotes the length of the shortest fiber;
    t denotes the averaged fiber interval on the first surface;
    n denotes the number of fibers present between the relevant fiber and the shortest fiber; and
    θ denotes an angle of the straight line passing through the position of the relevant fiber on the first surface and the position of the same fiber on the second surface with respect to the first surface.

20. The optical device as claimed in claim 1, wherein the refractive index n1 of the plurality of high-refractive-index regions and the refractive index n2 of a low-refractive-index region surrounding the high-refractive-index regions satisfy the following formula:

$$n1^2-n2^2 \geq 0.07$$

21. The optical device as claimed in claim 20, wherein the refractive indexes n1 and n2 satisfy the following formula:

$$n1^2-n2^2 \geq 0.25$$

22. The optical device as claimed in claim 1, wherein a cross-sectional area of the high-refractive-index region is smaller at least a part thereof than those on the first and second surfaces.

23. The optical device as claimed in claim 1 wherein each high-refractive-index region has an extending-end expanding-tapered shape such as to increase a cross-sectional area gradually in at least one of the proximity of the first surface and the proximity of the second surface.

24. The optical device as claimed in claim 1, wherein the following formula (4) is satisfied:

$$b < 252/(1-X) \qquad (4)$$

where:
- b ($\mu m^2$) denotes a cross-sectional area of at least a part of the high-refractive-index region other than both end parts thereof; and
- X denotes a value obtained from dividing a cross-sectional area of the high-refractive-index region on the first surface by that on the second surface, where X<1.

25. An image magnifying display device comprising:
the image magnifying/reducing optical device claimed in claim 1; and
a display unit disposed so as to face the first surface of said image magnifying/reducing optical device.

26. An image reducing reading device comprising:
the image magnifying/reducing optical device claimed in claim 1; and
a two-dimensional solid image pickup device disposed so as to face the first surface of said image magnifying/reducing optical device.

27. A method of manufacturing the optical device claimed in clam 18, comprising the step of a) making the high-polymer fibers from photo-curing resin.

28. The method as claimed in claim 27, further comprising the steps of:
b) forming the high-polymer fibers by applying high-directivity light to the photo-curing resin; and
c) bundling the thus-formed fibers so as to yield said plurality of high-refractive-index regions.

29. The method as claimed in claim 28, further comprising the steps of:
d) disposing one end of a bundle of the fibers in a close collected state;
e) disposing the other end of said bundle of the fibers in a spaced state;
f) immersing said other end of said bundle fibers into photo-curing resin mixed solution; and
g) applying light into said one end of said bundle of fibers so as to form tapered parts extending from said other end of bundle of fibers.

30. The method as claimed in claim 28, further comprising the steps of:
d) disposing a substrate having one of a convex shape and a concave shape for each fiber of the bundle of fibers; and
e) applying light toward said substrate in the photo-curing resin so as to form one of a concave shape and a convex shape on an end surface of each fiber of the bundle of fibers thus formed.

31. The method as claimed in claim 27, further comprising the steps of:
b) providing one of a light absorbing layer and a metal film on a side surface of each high-polymer fiber.

32. The method as claimed in claim 28, wherein:
in said d), light is applied to the photo-curing resin mixed solution via a shrinkable mesh-like high-polymer member so as to form the fibers; and
then, said mesh-like high-polymer member is caused to shrink so that the intervals of the fibers are shortened without disarrangement of the fibers, and, thus, the fibers are joined closely together.

33. The method as claimed in claim 32, wherein said shrinkable mesh-like member can enter a high-polymer gel state.

34. A method of manufacturing the image magnifying/reducing optical device claimed in claim 1 comprising the steps of:
a) producing a plurality of thin plates each having a plurality of high-refractive-index regions; and
b) coupling said plurality of thin plates together.

35. The method as claimed in claim 34, wherein said thin plates are made of material which has a refractive index changeable as a result of ultraviolet ray being applied thereto.

36. The method as claimed in claim 34, wherein:
in each thin plate, the plurality of high-refractive-index regions have a refractive index higher than that of a surrounding region, and have a two-dimensional pattern in which the plurality of high-refractive-index regions are apart from each other;
the plurality of thin plates are different in an area of each high-refractive-index region in many steps; and
in said step b), the plurality of thin plates are laminated together in the order of the area of high-refractive-index region, and in such a manner that the corresponding high-refractive-index regions are continuous through the plurality of thin plates.

37. A method of manufacturing the image magnifying/reducing optical device claimed in claim 1, comprising the steps of a) bundling a plurality of high-refractive-index fibers for said plurality of high-refractive-index regions, by using a mesh structure having variable intervals of elements thereof.

38. The method as claimed in claim 37, wherein a conic guiding member is used for inserting each fiber of the plurality of high-refractive-index fibers into the mesh structure.

39. The method as claimed in claim 37, further comprising the step of coating adhesive on the fibers.

40. The method as claimed in claim 37, wherein at least a part of the fibers is made of photo-curing resin.

41. A method of manufacturing the image magnifying/reducing optical device claimed in claim 1, comprising the steps of:

a) bundling a plurality of high-refractive-index fibers for the plurality of high-refractive-index regions, so as to form a bundle of fibers; and b) applying light into photo-curing resin mixed solution through the plurality of high-refractive-index fibers so as to form expanding tapered parts extending from one end of the bundle of fibers.

42. The method as claimed in claim 41, further comprising the steps of:]

c) applying light into photo-curing resin mixed solution through the plurality of high-refractive-index fibers, after said step b), so as to form expanding tapered parts extending from the other end of the bundle of fibers.

43. The method as claimed in claim 41, further comprising the steps of:

c) disposing a substrate having one of a convex shape and a concave shape for each fiber of the bundle of fibers; and d) applying light toward said substrate in the photo-curing resin so as to form one of a concave shape and a convex shape on an end surface of each fiber of said bundle of fibers.

44. The method as claimed in claim 42, further comprising the steps of:

d) disposing a substrate having one of a convex shape and a concave shape for each fiber of the bundle of fibers; and e) applying light toward said substrate in the photo-curing resin so as to form one of a concave shape and a convex shape on an end surface of each fiber of said bundle of fibers.

45. The method as claimed in claim 41, further comprising the steps of:

c) providing one of a light absorbing layer and a metal film on a side surface of each high-polymer fiber.

46. The method as claimed in claim 42, further comprising the steps of:

d) providing one of a light absorbing layer and a metal film on a side surface of each high-polymer fiber.

* * * * *